US011131997B2

(12) United States Patent
Yamada

(10) Patent No.: US 11,131,997 B2
(45) Date of Patent: Sep. 28, 2021

(54) ROUTE GENERATION APPARATUS

(71) Applicant: TOYOTA JIDOSHA KABUSHIKI KAISHA, Toyota (JP)

(72) Inventor: Aya Yamada, Atsugi (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 266 days.

(21) Appl. No.: 16/291,653

(22) Filed: Mar. 4, 2019

(65) Prior Publication Data

US 2019/0271986 A1    Sep. 5, 2019

(30) Foreign Application Priority Data

Mar. 5, 2018    (JP) .............................. JP2018-038708

(51) Int. Cl.
*G06K 9/00* (2006.01)
*G05D 1/02* (2020.01)
*B60W 30/06* (2006.01)

(52) U.S. Cl.
CPC ........... *G05D 1/0221* (2013.01); *B60W 30/06* (2013.01); *G05D 1/0238* (2013.01); *G06K 9/00805* (2013.01); *G05D 2201/0213* (2013.01)

(58) Field of Classification Search
CPC .......................................... B60W 2050/0025
See application file for complete search history.

(56) References Cited

U.S. PATENT DOCUMENTS

| 2012/0101654 | A1  | 4/2012 | Samples et al. |
| 2013/0085637 | A1* | 4/2013 | Grimm .................... G05D 1/00 701/25 |
| 2014/0249740 | A1  | 9/2014 | Niemz |
| 2017/0241790 | A1* | 8/2017 | Yoshikawa ........ G01C 21/3446 |
| 2020/0116495 | A1* | 4/2020 | Yasui .............. B60W 30/18163 |

FOREIGN PATENT DOCUMENTS

| DE | 102011080930 A1 | 2/2013 |
| DE | 102012202481 A1 | 8/2013 |
| EP |      2628662 A1 | 8/2013 |
| JP |    2013-530867 A | 8/2013 |
| JP |    2017-151687 A | 8/2017 |
| JP |    2017-165407 A | 9/2017 |

* cited by examiner

*Primary Examiner* — Thomas G Black
*Assistant Examiner* — Ana D Thomas
(74) *Attorney, Agent, or Firm* — Sughrue Mion, PLLC

(57) ABSTRACT

A route generation apparatus (13) has: a generating device (132) and a setting device (132). The generating device generates, on the basis of an evaluation score (SC2), a moving route of a movable object (1) that reaches a second position (WP_end) from a first position (WP_start) so as to avoid an interference between the movable object and an obstacle (O). The evaluation score is obtained by executing a weighting process on a distance (D_FL, D_FR, D_RL, D_RR) between the obstacle and specific portions (E_FL, E_FR, E_RL, E_RR) of the movable object on the basis of weighting coefficients (w_FL, w_FR, w_RL, w_RR). The setting device sets at least one weighting coefficient on the basis of a moving condition of the movable object during a period when the movable objects moves on the moving route.

9 Claims, 12 Drawing Sheets

ROUTE GENERATION APPARATUS

TECHNICAL FIELD

The present invention relates to a technical field of a route generation apparatus that is configured to generate a moving route on which a movable object moves, for example.

BACKGROUND ART

A Patent Literature 1 discloses one example of a route generation apparatus. Specifically, the route generation apparatus disclosed in the Patent Literature 1 is configured to generate a moving route (a route plan) from a current position of a movable object to a goal point by a processing based on a RRT (Rapidly exploring Random Tree) algorithm so as to be able to avoid a future interference between the movable object and an obstacle in a case where a future occurrence of an interference between the movable body and the obstacle is predicted. Moreover, the route generation apparatus disclosed in the Patent Literature 1 is configured to correct the generated moving route by a processing based on a potential method so as to reduce a repulsive force acting from a potential field of the obstacle in a case where the moving route generated by the processing based on the RRT algorithm includes a section that is affected by the potential field of the obstacle.

Note that there is a Patent Literature 2 as another document relating to the present invention.

CITATION LIST

Patent Literature

[Patent Literature 1] Japanese Unexamined Patent Application Publication No. 2017-151687
[Patent Literature 2] Japanese Unexamined Patent Application Publication No. 2013-530867

SUMMARY OF INVENTION

Technical Problem

The route generation apparatus disclosed in the Patent Literature 1 generates and corrects the moving route on the basis of an information relating to a distance between the movable object and the obstacle (for example, on the basis of an information relating to a positional relationship between the obstacle and an existing area in which the movable object exists, a grid map information in the potential method and the like) so as to avoid the future interference between the movable object and the obstacle and to reduce the repulsive force acting from the potential field of the obstacle. However, there is a possibility that a possibility that the obstacle interferes with one portion of the movable object is higher than a possibility that the obstacle interferes with another one portion of the movable object, depending on a moving condition of the movable object. For example, when the movable object moves frontward, there is a possibility that a possibility that the obstacle interferes with a front edge portion including a front edge part of the movable object is higher than a possibility that the obstacle interferes with a rear edge portion including a rear edge part of the movable object. However, the route generation apparatus disclosed in the Patent Literature 1 generates the moving route without considering that the possibility of the occurrence of the interference between the movable object and the obstacle varies depending on a difference of the moving condition of the movable object. Therefore, the route generation apparatus disclosed in the Patent Literature 1 has a technical problem that the route generation apparatus is not capable of necessarily generating the moving route so as to appropriately avoid the interference between the movable object and the obstacle. For example, there is a possibility that the route generation apparatus disclosed in the Patent Literature 1 generates the moving route so that the rear edge portion of the movable object that is less likely to interfere with the obstacle is away from the obstacle more than necessary when the movable object moves frontward. Namely, there is a possibility that the route generation apparatus disclosed in the Patent Literature 1 generates the moving route that provides a feeling of strangeness to a user of the movable object).

The above described technical problem is one example of the technical problem to be solved by the present invention. It is therefore an object of the present invention to provide, for example, a route generation apparatus that is configured to generate a moving route so as to avoid an interference between a movable object and an obstacle more appropriately.

Solution to Problem

One aspect of a route generation apparatus of the present invention is provided with: a generating device that is configured to generate, on the basis of an evaluation score, a moving route of a movable object that reaches a second position from a first position so as to avoid an interference between the movable object and at least one obstacle that is likely to interfere with each of a plurality of specific portions of the movable object during a period when the movable objects moves from the first position to the second position, the evaluation score being obtained by executing a weighting process on a distance between the obstacle and each of the plurality of specific portions on the basis of a plurality of weighting coefficients that correspond to the plurality of specific portions, respectively; and a setting device that is configured to set at least one of the plurality of weighting coefficients on the basis of a moving condition of the movable object during a period when the movable objects moves on the moving route.

DESCRIPTION OF EMBODIMENTS

Hereinafter, with reference to drawings, one embodiment of the parking assist apparatus of the present invention will be described. In the following description, a vehicle 1 to which one embodiment of the route generation apparatus of the present invention is adapted will be described.

(1) Structure of Vehicle 1

Figure 1:
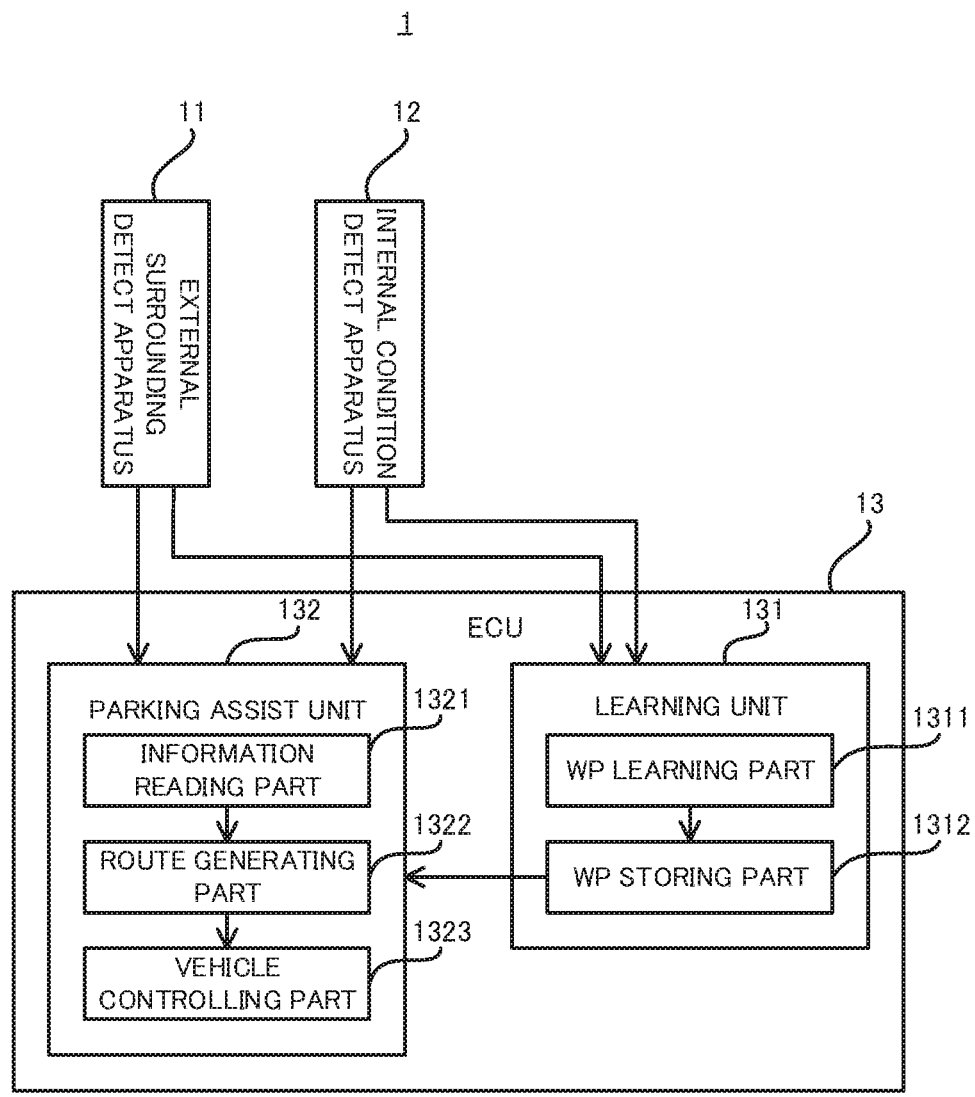
FIG. 1 is a block diagram that illustrates a structure of a vehicle in a present embodiment.

Firstly, with reference to FIG. 1, the structure of the vehicle 1 in the present embodiment will be explained. As illustrated in FIG. 1, the vehicle 1 has: an external surrounding detect apparatus 11; an internal condition detect apparatus 12; and an ECU (Electronic Control Unit) 13 that is one example of each of a "route generation apparatus" and a "controller" in a below described additional statement.

The external surrounding detect apparatus 11 is a detect apparatus that is configured to detect an external surrounding (in other words, an external circumstance, condition or situation) of the vehicle 1. The external surrounding may include a condition or a situation around the vehicle (what we call a traveling environment or a driving environment), for example. The external surrounding detect apparatus 11 includes at least one of a camera, a radar and a LIDAR (Light Detection and Ranging), for example.

The internal condition detect apparatus 12 is a detect apparatus that is configured to detect an internal condition (in other words, an internal state) of the vehicle 1. The internal condition may include a traveling condition (in other words, a driving condition) of the vehicle 1, for example. The internal condition may include an operating condition (in other words, an operating state) of each of various devices of the vehicle 1, for example. The internal condition detect apparatus 12 includes at least one of a speed sensor that is configured to detect a speed of the vehicle 1, a shift position sensor that is configured to detect a shift range (in other words, a gear range or a shift position) of the vehicle 1, a steering angle sensor that is configured to detect a steering angle (for example, a rotational angle) of a steering wheel of the vehicle 1, a steered angle sensor that is configured to detect a steered angle (in other words, a rudder angle) of a steered wheel (in other word, a steered tire) of the vehicle 1 and a position sensor (for example, a GPS (Global Positioning System) sensor) that is configured to detect a position of the vehicle 1.

The ECU 13 is configured to control entire operation of the vehicle 1. Especially in the present embodiment, the ECU 13 is configured to execute a learning process for learning, as a waypoint WP, the position of the vehicle 1 at a timing when a behavior of the vehicle 1 satisfies a specific condition, when a driver parks the vehicle 1 in a desired parking space SP. Moreover, the ECU 13 is configured to execute a parking assist process for automatically parking the vehicle 1 in the desired parking space SP on the basis of the waypoint WP learned by the learning process.

In order to execute the learning process, the ECU 13 includes, as a processing block that is logically realized in the ECU 13 or a processing circuit that is physically realized in the ECU 13, a learning unit 131. The learning unit 131 includes, as processing blocks that are logically realized in the learning unit 131 or processing circuits that are physically realized in the learning unit 131, a waypoint learning part 1311 (hereinafter, the waypoint learning part 1311 is referred to as a "WP learning part 1311") and a waypoint storing part 1312 (hereinafter, the waypoint storing part 1312 is referred to as a "WP storing part 1312"). Moreover, in order to execute the parking assist process, the ECU 13 includes, as a processing block that is logically realized in the ECU 13 or a processing circuit that is physically realized in the ECU 13, a parking assist unit 132. The parking assist unit 132 includes, as processing blocks that are logically realized in the parking assist unit 132 or processing circuits that are physically realized in the parking assist unit 132, an information reading part 1321, a route generating part 1322 that is one example of each of a "setting device" and a "generating device" in the below described additional statement and a vehicle controlling part 1323. Note that the operation of each of the learning unit 131 and the parking assist unit 132 will be described later in detail with reference to FIG. 2 and so on.

(2) Operation of ECU 13

Next, the learning process and the parking assist process that are executed by the ECU 13 will be described in order.

(2-1) Flow of Learning Process

Figure 2:
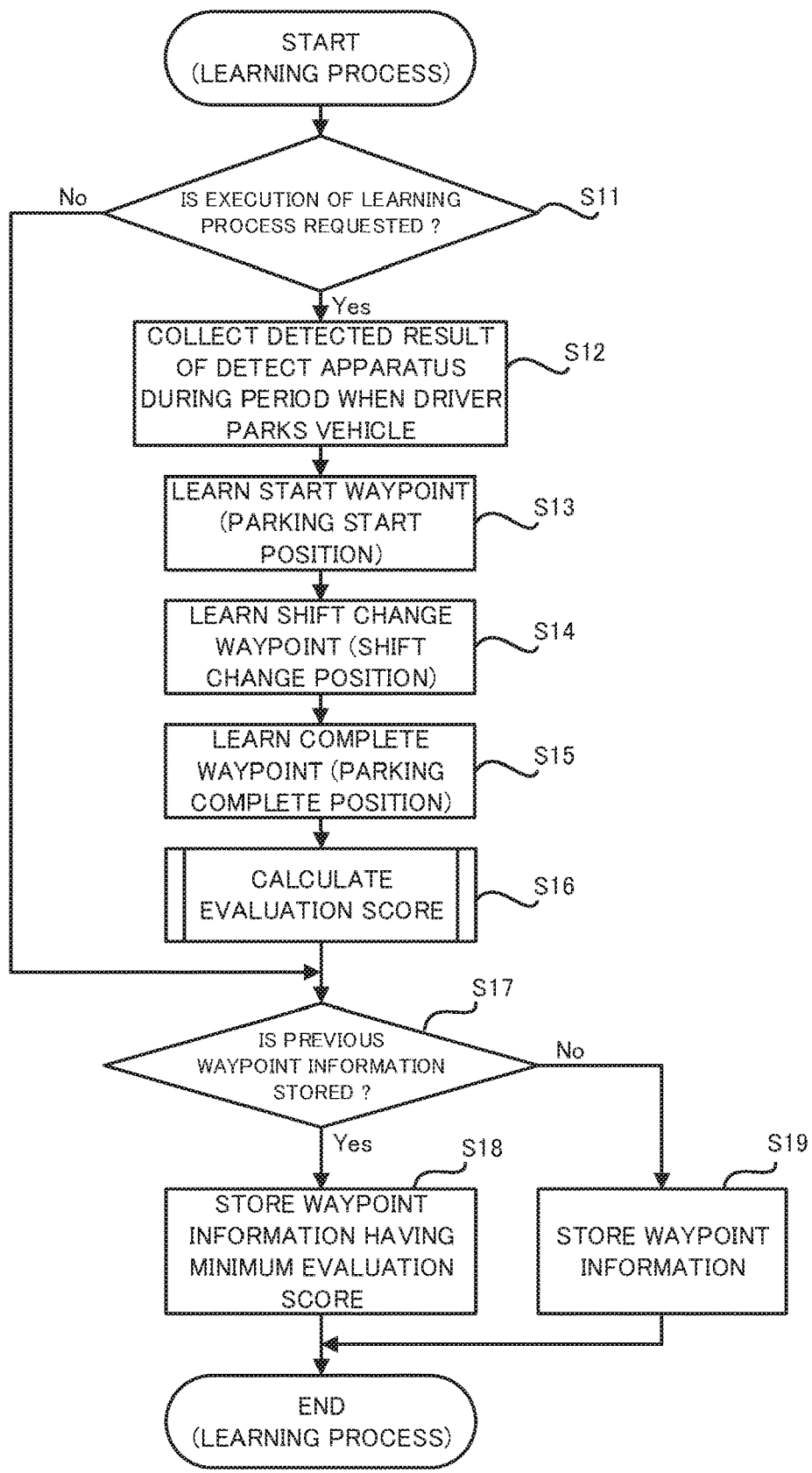
FIG. 2 is a flowchart that illustrates a flow of a learning process in the present embodiment.

Firstly, with reference to FIG. 2, a flow of the learning process in the present embodiment will be described. FIG. 2 is a flowchart that illustrates the flow of the learning process in the present embodiment.

As illustrated in FIG. 2, the learning unit 131 determines whether or not the driver requests an execution of the learning process (a step S11). Specifically, the learning unit 131 determines whether or not the driver operates an operating apparatus (especially, an operating apparatus that is configured to be operated by the driver to request the execution of the learning process) of the vehicle 1. If the driver operates the operating apparatus, the learning unit 131 determines that the driver requests the execution of the learning process. Note that the learning process is executed when the driver performs a parking operation for parking the vehicle 1 in the desired parking space SP. Thus, the driver typically requests the execution of the learning process before starting to perform the parking operation.

As a result of the determination at the step S11, if it is determined that the driver does not request the execution of the learning process (the step S11: No), the learning unit 131 terminates the learning process illustrated in FIG. 2. When the learning unit 131 terminates the learning process illustrated in FIG. 2, the learning unit 131 starts the learning process illustrated in FIG. 2 again after a first predetermined period elapses.

On the other hand, as a result of the determination at the step S11, if it is determined that the driver requests the execution of the learning process (the step S11: Yes), the WP learning part 1311 collects a detection information that is a detected result of the external circumstance detect apparatus 11 and the internal condition detect apparatus 12 during a period when the driver parks the vehicle 1 by performing the parking operation (a step S12). Note that the process at step S12 may be executed in parallel with the processes from a below described steps S13 to S15, because the learning process is executed during a period when the driver performs the parking operation.

Then, the WP learning part 1311 learns, as a start waypoint WP_start, the position of the vehicle 1 at a parking start timing at which the driver starts the parking operation on the basis of the detection information collected at the step S12 (a step S13). Namely, the WP learning part 1311 learns a parking start position as the start waypoint WP_start. The parking start timing may be a timing at which the driver requests the execution of the learning process. Alternatively, the parking start timing may be a timing at which the vehicle 1 starts to travel (in other words, move). Namely, the parking start timing may be a timing at which the speed of the vehicle 1 changes from zero to a value larger than zero. Alternatively, the parking start timing may be a timing at which the shift range of the vehicle 1 is changed from one range (for example, a P (Parking) range or a N (Neutral) range) that is used when the vehicle 1 stops to another range (for example, a D (Drive) range or a R (Reverse) range) that is used when the vehicle 1 travels. Note that the present embodiment is described by using an example in which the parking start timing is the timing at which the shift range of the vehicle 1 is changed from the P range or the N range to the D range, for the purpose of simple description. Namely, the present embodiment is described by using an example in which the driver parks the vehicle 1 in the parking space SP by making the vehicle 1 travel frontward from the parking start position.

Moreover, the WP learning part 1311 learns, as a shift change waypoint WP_shift, the position of the vehicle 1 at a shift change timing at which the driver changes the shift range in order to change a traveling direction of the vehicle 1 after the driver starts the parking operation on the basis of the detection information collected at the step S12 (a step S14). Namely, the WP learning part 1311 learns a shift change position as the shift change waypoint WP_shift. The shift change timing is a timing at which the shift range is changed from one range (for example, the D range) that is used to make the vehicle 1 travel frontward to another range (for example, the R range) that is used to make the vehicle 1 travel backward or from one range (for example, the R range) that is used to make the vehicle 1 travel backward to another range (for example, the D range) that is used to make the vehicle 1 travel frontward. Note that the present embodiment is described by using an example in which the shift change timing is the timing at which the shift range of the vehicle 1 is changed from the D range to the R range, for the purpose of simple description. Namely, the present embodiment is described by using an example in which the driver moves the vehicle 1 to a desired position by making the vehicle 1 travel frontward from the parking start position and then parks the vehicle 1 in the parking space SP by making the vehicle 1 travel backward.

Moreover, the WP learning part 1311 learns, as a complete waypoint WP_end, the position of the vehicle 1 at a parking complete timing at which the driver completes (in other words, ends or finishes) the parking operation on the basis of the detection information collected at the step S12 (a step S15). Namely, the WP learning part 1311 learns a parking complete position as the complete waypoint WP_end. The parking complete timing may be a timing at which the driver requests an end (in other words, a termination) of the learning process. Alternatively, the parking complete timing may be a timing at which a predetermined time elapses after the vehicle 1 stops. Namely, the parking complete timing may be a timing at which the predetermined time elapses after the speed of the vehicle 1 changes from the value larger than zero to zero. Alternatively, the parking complete timing may be a timing at which the shift range of the vehicle 1 is changed from one range that is used when the vehicle 1 travels to another range that is used when the vehicle 1 stops. Note that the present embodiment is described by using an example in which the parking complete timing is the timing at which the shift range of the vehicle 1 is changed from the R range to the P range, for the purpose of simple description.

Then, the WP learning part 1311 calculates an evaluation score SC1 of a traveling route TR_actual along which the vehicle 1 actually travels by the parking operation (a step S16). The evaluation score SC1 is a quantitative index value that represents an optimum degree (in other word, a degree of a goodness or an appropriateness) of the traveling route TR_actual. When the traveling route TR_actual is appropriate, there is a relatively high possibility that the parking operation is appropriate. Therefore, it can be said that the evaluation score SC1 is a quantitative index value that represents an optimum degree of the parking operation performed by the driver. Note that the present embodiment uses an example in which the evaluation score SC1 is defined so that the evaluation score SC1 becomes smaller as the traveling route TR_actual becomes more appropriate.

Figure 3:
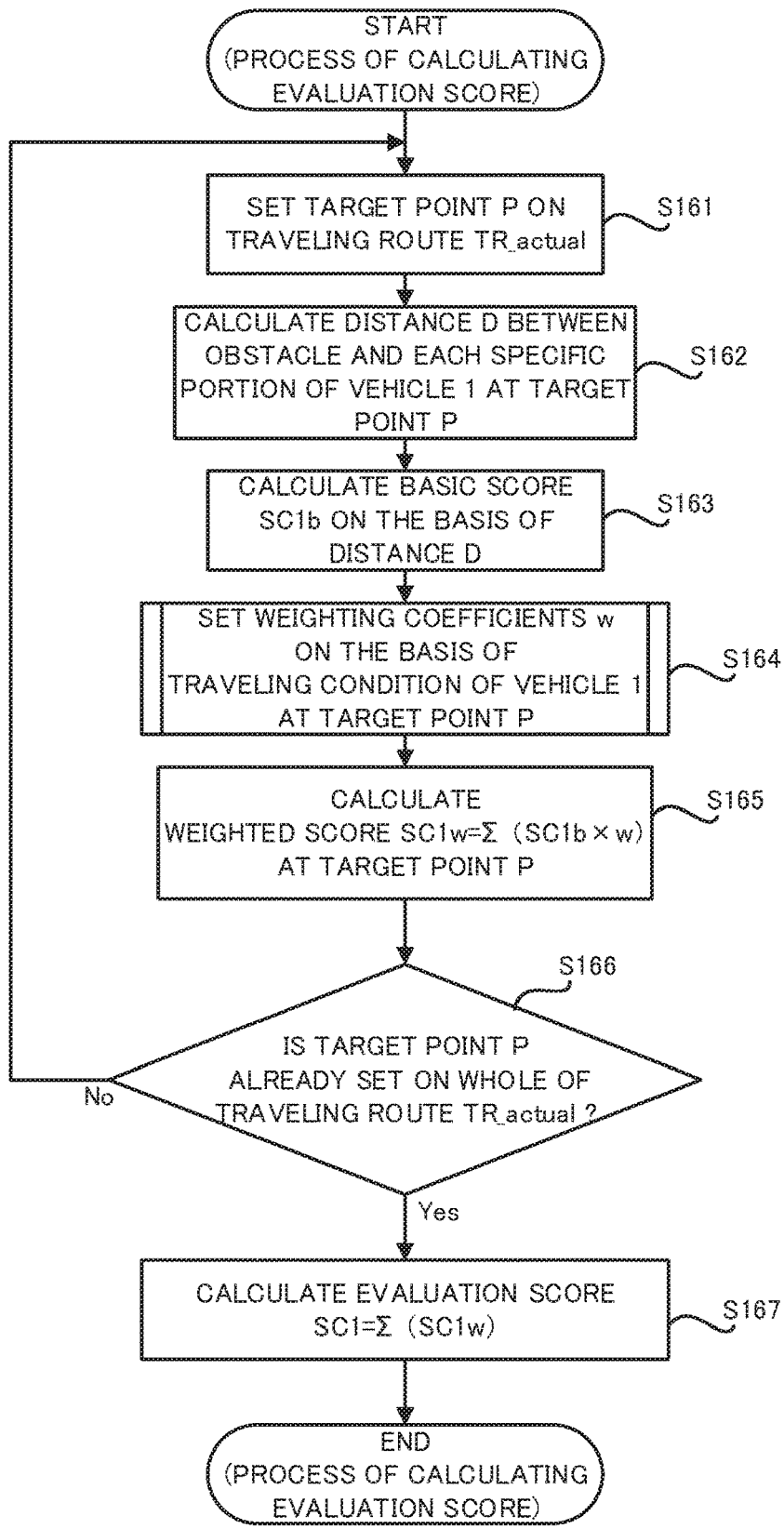
FIG. 3 is a flowchart that illustrates a flow of a process of calculating an evaluation score at a step S16 in FIG. 2.

The evaluation score SC1 is an index value that is determined on the basis of at least a distance between the vehicle 1 traveling along the traveling route TR_actual and an obstacle O (namely, an object that prevents the vehicle 1 from traveling) that exists around the traveling route TR_actual. Specifically, the evaluation score SC1 is an index value that is determined on the basis of the premise that the traveling route TR_actual becomes more appropriate as the distance between the vehicle 1 and the obstacle O becomes larger, for example. This is because the possibility that the obstacle O interferes with (in other words, collides with) the vehicle 1 is estimated to be lower as the distance between the vehicle 1 and the obstacle O becomes larger. The present embodiment uses an example in which the evaluation score SC1 is a score that becomes smaller as the distance between the vehicle 1 and the obstacle O becomes larger. Next, with reference to FIG. 3, a process of calculating the evaluation score SC1 at the step S16 in FIG. 2 will be described. FIG. 3 is a flowchart that illustrates a flow of the process of calculating the evaluation score SC1 at the step S16 in FIG. 2. Note that the process illustrated in FIG. 3 is one example of the process of calculating the evaluation score SC1, and the WP learning part 1311 may calculate the evaluation score SC1 by using another method.

As illustrated in FIG. 3, the WP learning part 1311 sets a target point P on the traveling route TR_actual (a step S161).

Figure 4:
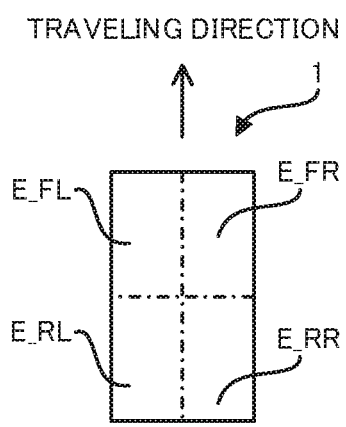
FIG. 4 is a planar view that illustrates specific portions of the vehicle that are set in order to calculate the evaluation score.

Then, the WP learning part 1311 calculates a distance D between the obstacle O and each of a plurality of specific portions E of the vehicle 1 locating at the target point P on the basis of the detection information collected at the step S12 (a step S162). Each of the plurality of specific portions E is one part of the vehicle 1. Positions of the plurality of specific portions E are different from one another. In the present embodiment, as illustrated in FIG. 4, the plurality of specific portions E include: a left front edge portion E_FL that includes a left front edge part of the vehicle 1; a right front edge portion E_FR that includes a right front edge part of the vehicle 1; a left rear edge portion E_RL that includes a left rear edge part of the vehicle 1; and a right rear edge portion E_RR that includes a right rear edge part of the vehicle 1. Of course, the plurality of specific portions E may include another portion of the vehicle 1 in addition to or instead of at least one of the left front edge portion E_FL, the right front edge portion E_FR, the left rear edge portion E_RL and the right rear edge portion E_RR.

Figure 5A:
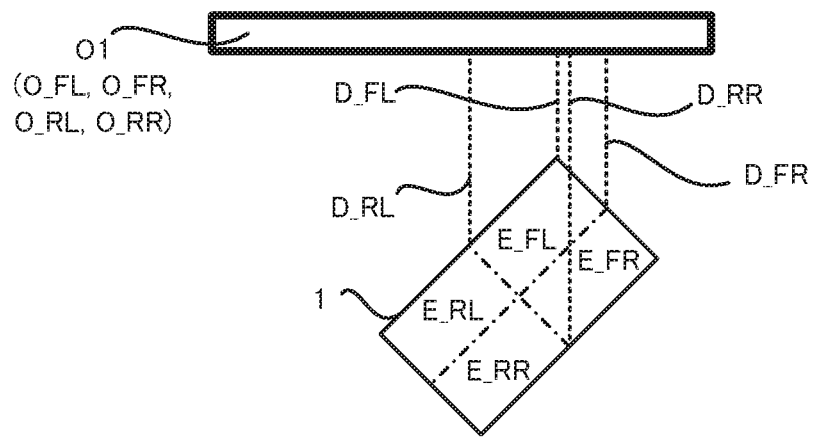
FIG. 5 Each of FIG. 5A to FIG. 5C is a planar view that illustrates a distance between each specific portion of the vehicle and an obstacle.
Figure 5B:
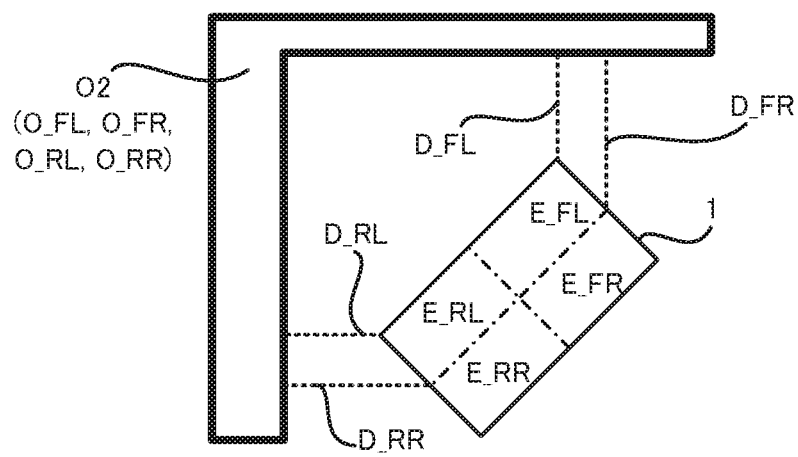
Figure 5C:
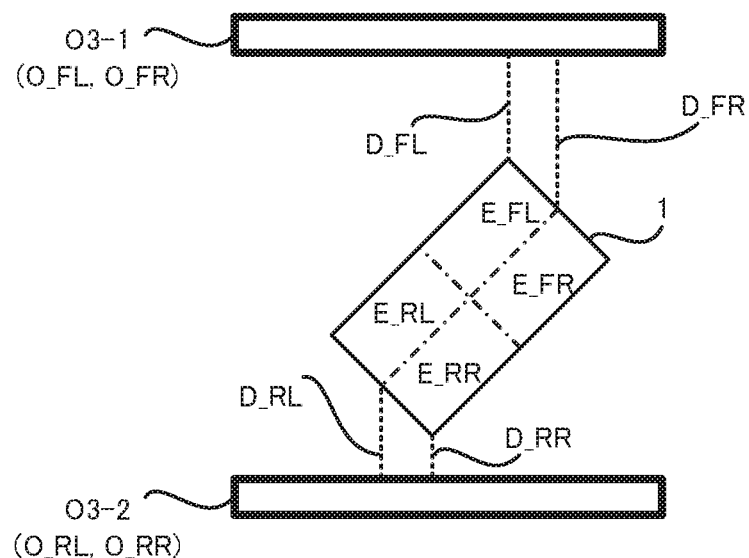

The distance D between each specific portion E and the obstacle O means a distance (especially, the shortest distance) between an outer surface of each specific portion E that is likely to interfere with the obstacle O and the obstacle O that is closest to each specific portion E (especially, its outer surface) when the vehicle 1 is located at the target point P. Thus, the WP learning part 1311 calculates: a distance D_FL between the left front edge portion E_FL and an obstacle O_FL that is closest to the left front edge portion E_FL when the vehicle 1 is located at the target point P; a distance D_FR between the right front edge portion E_FR and an obstacle O_FR that is closest to the right front edge portion E_FR when the vehicle 1 is located at the target point P; a distance D_RL between the left rear edge portion E_RL and an obstacle O_RL that is closest to the left rear edge portion E_RL when the vehicle 1 is located at the target point P; and a distance D_RR between the right rear edge portion E_RR and an obstacle O_RR that is closest to the right rear edge portion E_RR when the vehicle 1 is located at the target point P. In this case, as illustrated in FIG. 5A and FIG. 5B, the obstacles O_FL, O_FR, O_RL and O_RR may be same obstacle (an obstacle O1 in FIG. 5A and an obstacle O2 in FIG. 5B). Alternatively, as illustrated in FIG. 5C, at least two of the obstacles O_FL, O_FR, O_RL and O_RR may be different obstacles from each other. FIG. 5C illustrates an example in which each of the obstacles O_FL and O_FR is an obstacle O3-1 and each of the obstacles O_RL and O_RR is an obstacle O3-2.

Figure 6:
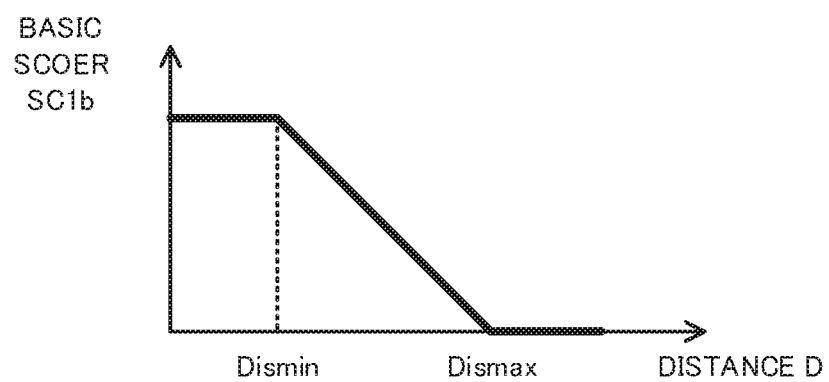
FIG. 6 is a map that illustrates a relationship between a basic score and the distance between t each specific portion of the vehicle and the obstacle.

Then, the WP learning part 1311 calculates a basic score SC1$b$ for each specific portion E on the basis of the distance D calculated at the step S162 (a step S163). Namely, the WP learning part 1311 calculates a basic score SC1$b$_FL corresponding to the left front edge portion E_FL on the basis of the distance D_FL, calculates a basic score SC1$b$_FR corresponding to the right front edge portion E_FR on the basis of the distance D_FR, calculates a basic score SC1$b$_RL corresponding to the left rear edge portion E_RL on the basis of the distance D_RL and calculates a basic score SC1$b$_RR corresponding to the right rear edge portion E_RR on the basis of the distance D_RR. In this case, the WP learning part 1311 calculates the basic score SC1$b$ on the basis of a map that represents a relationship between the distance D and the basic score SC1$b$. The relationship between the distance D and the basic score SC1$b$ represented by the map is determined so that the basic score SC1$b$ becomes smaller as the distance D becomes larger. One example of the map is illustrated in FIG. 6. FIG. 6 illustrate the map in which (i) the basic score SC1$b$ becomes smaller as the distance D becomes larger, when the distance D is equal to or larger than a threshold value Dismin and equal to or smaller than a threshold value Dismax (note that the threshold value Dismax is larger than the threshold value Dismin), (ii) the basic score SC1$b$ is constant (specifically, is fixed to the basic score SC1$b$ used when the distance D is equal to the threshold value Dismin) regardless of the distance D, when the distance D is smaller than threshold value Dismin, and (iii) the basic score SC1$b$ is constant (specifically, is fixed to the basic score SC1$b$ used when the distance D is equal to the threshold value Dismax) regardless of the distance D, when the distance D is larger than threshold value Dismax.

If there is a first specific portion E that is less likely to interfere with the obstacle O due to a second specific portion E that is between the first specific portion E and the obstacle O, the basic score SC1$b$ for the first specific portion E may be constant (for example, is fixed to the minimum value of the basic score SC1$b$) regardless of the distance D. This is because the first specific portion E with the obstacle O being between the first specific portion E and the second specific portion E is substantially equivalent to a third specific portion E that is relatively largely distant from the obstacle O, because there is relatively small possibility that the first specific portion E interferes with the obstacle O. For example, in an example illustrated in FIG. 5A, there are the left front edge portion E_FL, the right front edge portion E_FR and the left rear edge portion E_RL between the right rear edge portion E_RR and the obstacle O, and thus there is relatively small possibility that the right rear edge portion E_RR interferes with the obstacle O. Thus, the basic score SC1$b$_RR corresponding to the right rear edge portion E_RR may be constant (for example, may be fixed to the minimum value of the basic score SC1$b$).

Figure 7:
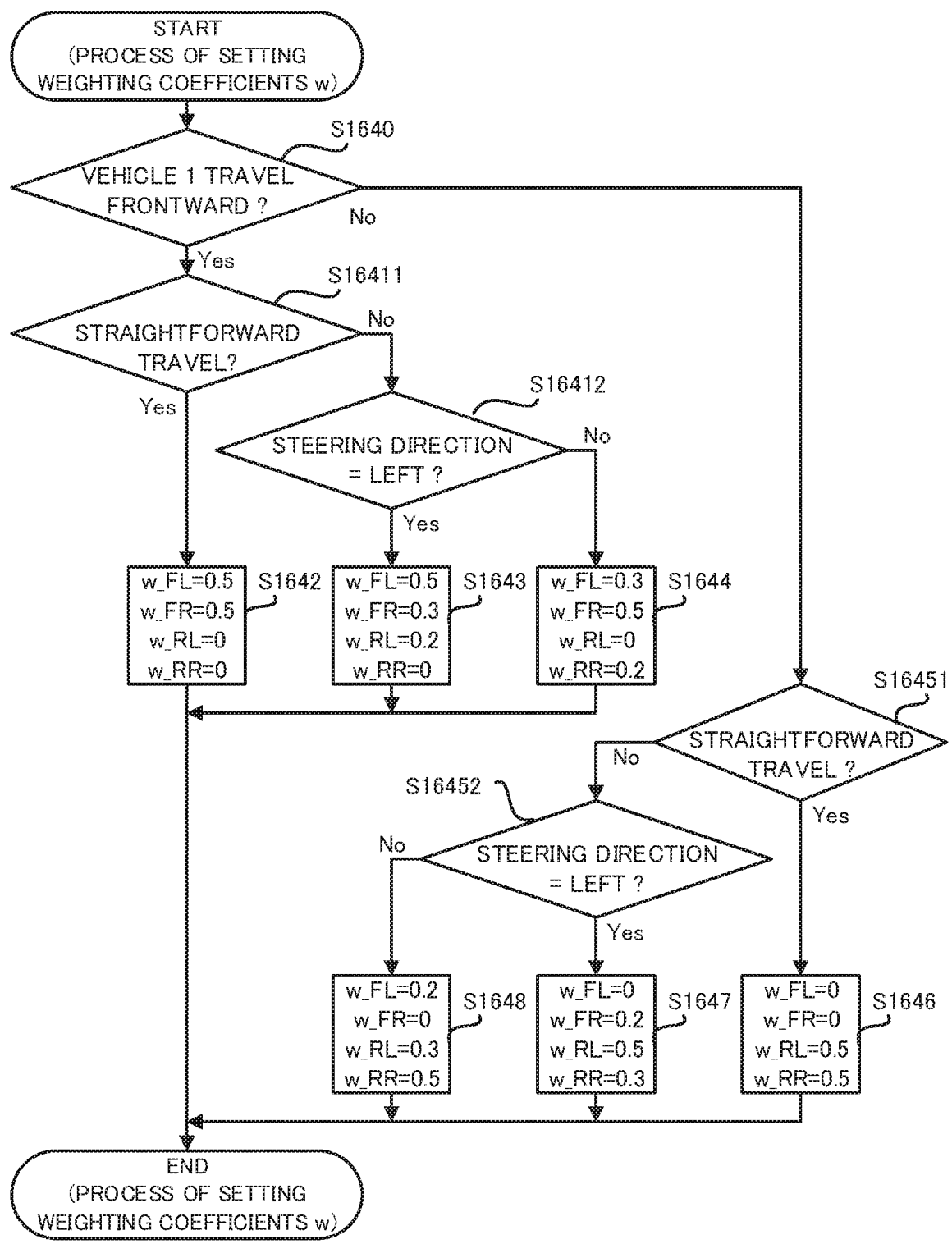
FIG. 7 is a flowchart that illustrates a flow of a process of setting weighting coefficients at a step S164 in FIG. 3.

Then, the WP learning part 1311 sets a plurality of weighting coefficients w on the basis of a traveling condition of the vehicle 1 at the target point P (a step S164). The plurality of weighting coefficients w corresponds to the plurality of specific portions E, respectively. Namely, the WP learning part 1311 sets a weighting coefficient w_FL corresponding to the left front edge portion E_FL, a weighting coefficient w_FR corresponding to the right front edge portion E_FR, a weighting coefficient w_RL corresponding to the left right edge portion E_RL and a weighting coefficient w_RR corresponding to the right rear edge portion E_RR. Next, with reference to FIG. 7, a process of setting the weighting coefficients w at the step S164 in FIG. 3 will be described. FIG. 7 is a flowchart that illustrates a flow of the process of setting the weighting coefficients w at the step S164 in FIG. 3

As illustrated in FIG. 7, the WP learning part 1311 determines whether or not the vehicle 1 travels frontward at the target point P (a step S1640).

As a result of the determination at the step S1640, if it is determined that the vehicle 1 travels frontward (the step S1640: Yes), the WP learning part 1311 determines whether or not the vehicle 1 travels straightforwardly at the target point P (a step S16411). Namely, the WP learning part 1311 determines whether or not the vehicle 1 in which the steering wheel is in a neutral state travels frontward at the target point P.

As a result of the determination at the step S16411, if it is determined that the vehicle 1 travels straightforwardly (the step S16411: Yes), the WP learning part 1311 sets the weighting coefficients w_FL, w_FR, w_RL and w_RR so that the weighting coefficients w_FL and w_FR are larger than the weighting coefficients w_RL and w_RR (a step S1642). For example, the WP learning part 1311 sets each of the weighting coefficients w_FL and w_FR to "0.5" and sets each of the weighting coefficients w_RL and w_RR to "0".

Allowing one weighting coefficient w to be larger than another weighting coefficient w in the learning process is equivalent to determining that the traveling route TR_actual that prioritizes avoiding the interference between the obstacle O and one specific portion E corresponding to one weighting coefficient w is more appropriate the traveling route TR_actual that prioritizes avoiding the interference between the obstacle O and another specific portion E corresponding to another weighting coefficient w. This is because the distance D between the obstacle O and one specific portion E is emphasized more than the distance D between the obstacle O and another specific portion E for the calculation of the evaluation score SC1 when one weighting coefficient w is larger than another weighting coefficient w, compared to the case where one weighting coefficient w is not larger than another weighting coefficient w. Thus, for example, allowing the weighting coefficients w_FL and w_FR to be larger than the weighting coefficients w_RL and w_RR at the step S1642 is equivalent to determining that the traveling route TR_actual that prioritizes avoiding the interference between the obstacle O_FL and the left front edge portion E_FL and the interference between the obstacle O_FR and the right front edge portion E_FR is more appropriate than the traveling route TR_actual that prioritizes avoiding the interference between the obstacle O_RL and the left rear edge portion E_RL and the interference between the obstacle O_RR and the right rear edge portion E_RR.

On the other hand, as a result of the determination at the step S16411, if it is determined that the vehicle 1 does not travel straightforwardly (the step S16411: No), the WP learning part 1311 determines whether or not a steering direction (in other words, a turning direction or a rotating direction) of the steering wheel is a left direction at the target point P (a step S16412). Namely, the WP learning part 1311 determines whether or not the steering wheel is rotated toward the left direction (for example, a counterclockwise direction, and a direction that allows the steered wheel to be steered toward the left direction) from the neutral position at the target point P. In other words, the WP learning part 1311 determines whether or not the vehicle 1 travels frontward while turning in the counterclockwise direction at the target point P.

As a result of the determination at the step S16412, if it is determined that the steering direction of the steering wheel is the left direction (namely, the vehicle 1 travels frontward while turning in the counterclockwise direction) (the step S16412: Yes), the WP learning part 1311 sets the weighting coefficients w_FL, w_FR, w_RL and w_RR so that (i) the weighting coefficients w_FL and w_FR are larger than the weighting coefficients w_RL and w_RR, (ii) the weighting coefficient w_FL is larger than the weighting coefficient w_FR and (iii) the weighting coefficient w_RL is larger than the weighting coefficient w_RR (a step S1643). For example, the WP learning part 1311 sets the weighting coefficient w_FL to "0.5", sets the weighting coefficient w_FR to "0.3", sets the weighting coefficient w_RL to "0.2" and sets the weighting coefficient w_RR to "0".

On the other hand, as a result of the determination at the step S16412, if it is determined that the steering direction of the steering wheel is not the left direction (namely, the vehicle 1 does not travel frontward while turning in the counterclockwise direction) (the step S16412: No), it is estimated that the steering direction of the steering wheel is a right direction at the target point P and the vehicle 1 travels frontward while turning in a clockwise direction at the target point P. In this case, the WP learning part 1311 sets the weighting coefficients w_FL, w_FR, w_RL and w_RR so that (i) the weighting coefficients w_FL and w_FR are larger than the weighting coefficients w_RL and w_RR, (ii) the weighting coefficient w_FR is larger than the weighting coefficient w_FL and (iii) the weighting coefficient w_RR is larger than the weighting coefficient w_RL (a step S1644).

For example, the WP learning part 1311 sets the weighting coefficient w_FR to "0.5", sets the weighting coefficient w_FL to "0.3", sets the weighting coefficient w_RR to "0.2" and sets the weighting coefficient w_RL to "0".

On the other hand, as a result of the determination at the step S1640, if it is determined that the vehicle 1 does not travel frontward at the target point P (the step S1640: No), it is estimated that the vehicle 1 travels backward. In this case, the WP learning part 1311 determines whether or not the vehicle 1 travels straightforwardly at the target point P (a step S16451). Namely, the WP learning part 1311 determines whether or not the vehicle 1 in which the steering wheel is in the neutral state travels backward at the target point P.

As a result of the determination at the step S16451, if it is determined that the vehicle 1 travels straightforwardly (the step S16451: Yes), the WP learning part 1311 sets the weighting coefficients w_FL, w_FR, w_RL and w_RR so that the weighting coefficients w_RL and w_RR are larger than the weighting coefficients w_FL and w_FR (a step S1646). For example, the WP learning part 1311 sets each of the weighting coefficients w_RL and w_RR to "0.5" and sets each of the weighting coefficients w_FL and w_FR to "0".

On the other hand, as a result of the determination at the step S16451, if it is determined that the vehicle 1 does not travel straightforwardly (the step S16451: No), the WP learning part 1311 determines whether or not the steering direction of the steering wheel is the left direction at the target point P (a step S16452). In other words, the WP learning part 1311 determines whether or not the vehicle 1 travels backward while turning in the clockwise direction at the target point P.

As a result of the determination at the step S16452, if it is determined that the steering direction of the steering wheel is the left direction (namely, the vehicle 1 travels backward while turning in the clockwise direction) (the step S16452: Yes), the WP learning part 1311 sets the weighting coefficients w_FL, w_FR, w_RL and w_RR so that (i) the weighting coefficients w_RL and w_RR are larger than the weighting coefficients w_FL and w_FR, (ii) the weighting coefficient w_RL is larger than the weighting coefficient w_RR and (iii) the weighting coefficient w_FR is larger than the weighting coefficient w_FL (a step S1647). For example, the WP learning part 1311 sets the weighting coefficient w_RL to "0.5", sets the weighting coefficient w_RR to "0.3", sets the weighting coefficient w_FR to "0.2" and sets the weighting coefficient w_FL to "0".

On the other hand, as a result of the determination at the step S16452, if it is determined that the steering direction of the steering wheel is not the left direction (namely, the vehicle 1 travels backward while turning in the clockwise direction) (the step S16452: No), it is estimated that the steering direction of the steering wheel is the right direction at the target point P and the vehicle 1 travels backward while turning in the counterclockwise direction at the target point P. In this case, the WP learning part 1311 sets the weighting coefficients w_FL, w_FR, w_RL and w_RR so that (i) the weighting coefficients w_RL and w_RR are larger than the weighting coefficients w_FL and w_FR, (ii) the weighting coefficient w_RR is larger than the weighting coefficient w_RL and (iii) the weighting coefficient w_FL is larger than the weighting coefficient w_FR (a step S1648). For example, the WP learning part 1311 sets the weighting coefficient w_RR to "0.5", sets the weighting coefficient w_RL to "0.3", sets the weighting coefficient w_FL to "0.2" and sets the weighting coefficient w_FR to "0".

Again in FIG. 3, then, the WP learning part 1311 calculates a weighted score SC1w at the target point P on the basis of the basic scores SC1b calculated at the step S163 and the weighting coefficients w set at the step S164 (a step S165). Specifically, the WP learning part 1311 calculates the weighted score SC1w by multiplying the basic score SC1b with the weighting coefficient w for each specific portion E and then adding the multiplied values for all specific portions E (namely, the values obtained by multiplying the basic score SC1b with the weighting coefficient w for each specific portion E). Namely, the WP learning part 1311 calculates the weighted score SC1w by using a mathematical formula of $SC1w=\Sigma(SC1b\times w)=SC1b\_FL\times w\_FL+SC1b\_FR\times w\_FR+SC1b\_RL\times w\_RL+SC1b\_RR\times w\_RR$.

Then, the WP learning part 1311 determines whether or not the target point P is already set on the whole of the traveling route TR_actual (a step S166). For example, the WP learning part 1311 determines whether or not the target point P is already set on all of the desired number of positions that arranged at a regular interval (alternatively, at a random interval) between a start point of the traveling route TR_actual and an end point of the traveling route TR_actual.

As a result of the determination at the step S166, if it is determined that the target point P is not set on the whole of the traveling route TR_actual yet (the step S166: No), the WP learning part 1311 sets new target point P on the traveling route TR_actual (the step S161), and then calculates the weighted score SC1w at the new target point P (the step S162 to the step S165).

On the other hand, as a result of the determination at the step S166, if it is determined that the target point P is already set on the whole of the traveling route TR_actual (the step S166: Yes), the WP learning part 1311 calculates, as the evaluation score SC1, a total sum of the weighted scores SC1w at the plurality of target points P ($=\Sigma(SC1w)$) (a step S167). Namely, the WP learning part 1311 substantially calculates the evaluation score SC1 by integrating the weighted score SC1w at a certain target points P on the traveling route TR_actual over the traveling route TR_actual.

Again in FIG. 2, the WP learning part 1311 makes the WP storing part 1312 store a waypoint information (hereinafter, the waypoint information is referred to as a "WP information") including an information set of the start waypoint WP_start learned at the step S13, the shift change waypoint WP_shift learned at the step S14, the complete waypoint WP_end learned at the step S15 and the evaluation score SC1 calculated at the step S16. In order to make the WP storing part 1312 store the WP information, the WP learning part 1311 firstly determines whether or not the WP information obtained in the past is already stored in the WP storing part 1312 (a step S17). Specifically, the WP learning part 1311 determines whether or not the WP storing part 1312 already stores the WP information including the start waypoint WP_start and the complete waypoint WP_end that are same as or near to the start waypoint WP_start and the complete waypoint WP_end that are newly obtained at this time learning process, respectively. If the WP storing part 1312 already stores the WP information including the start waypoint WP_start and the complete waypoint WP_end that are same as or near to the start waypoint WP_start and the complete waypoint WP_end that are newly obtained at this time learning process, respectively, the WP learning part 1311 determines that the WP information obtained in the past is already stored in the WP storing part 1312.

As a result of the determination at the step S17, if it is determined that the WP information obtained in the past is not stored in the WP storing part 1312 (the step S17: No), the WP learning part 1311 makes the WP storing part 1312 store the WP information that is newly obtained by this time learning process (a step S19).

On the other hand, as a result of the determination at the step S17, if it is determined that the WP information obtained in the past is already stored in the WP storing part 1312 (the step S17: Yes), the WP learning part 1311 makes the WP storing part 1312 store either one of the already stored WP information (namely, the WP information obtained in the past, and it is referred to as a "previous WP information") and the WP information newly obtained by this time learning process (it is referred to as a "new WP information") (a step S18). Specifically, the WP learning part 1311 determines which is smaller (namely, the smallest), the evaluation score SC1 of the traveling route TR_actual corresponding to the previous WP information or the evaluation score SC1 of the traveling route TR_actual corresponding to the new WP information. If it is determined that the evaluation score SC1 of the traveling route TR_actual corresponding to the new WP information is smaller than the evaluation score SC1 of the traveling route TR_actual corresponding to the previous WP information, the WP learning part 1311 makes the WP storing part 1312 store the new WP information. On the other hand, if it is determined that the evaluation score SC1 of the traveling route TR_actual corresponding to the new WP information is larger than the evaluation score SC1 of the traveling route TR_actual corresponding to the previous WP information, the WP learning part 1311 makes the WP storing part 1312 keep storing the previous WP information. Namely, the WP learning part 1311 makes the WP storing part 1312 store the WP information having the smaller evaluation score SC1 (namely, the smallest evaluation score SC1).

(2-2) Flow of Parking Assist Process

Figure 8:
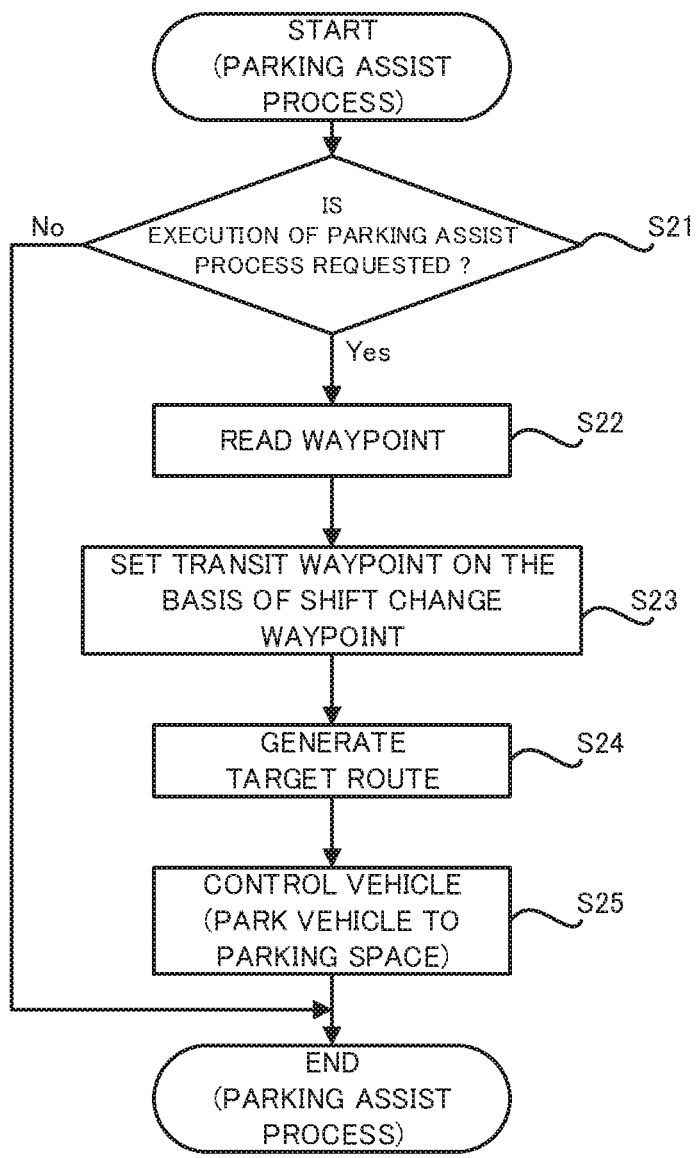
FIG. 8 is a flowchart that illustrates a flow of a parking assist process in the present embodiment.

Next, with reference to FIG. 8, a flow of the parking assist process in the present embodiment will be described. FIG. 8 is a flowchart that illustrates the flow of the parking assist process in the present embodiment.

As illustrated in FIG. 8, the parking assist unit 132 determines whether or not the driver requests an execution of the parking assist process (a step S21). Specifically, the parking assist unit 132 determines whether or not the driver operates an operating apparatus (especially, an operating apparatus that is configured to be operated by the driver to request the execution of the parking assist process) of the vehicle 1. If the driver operates the operating apparatus, the parking assist unit 132 determines that the driver requests the execution of the parking assist process.

As a result of the determination at the step S21, if it is determined that the driver does not request the execution of the parking assist process (the step S21: No), the parking assist unit 132 terminates the parking assist process illustrated in FIG. 8. When the parking assist unit 132 terminates the parking assist process illustrated in FIG. 8, the parking assist unit 132 starts the parking assist process illustrated in FIG. 8 again after a second predetermined period elapses.

Figure 9:
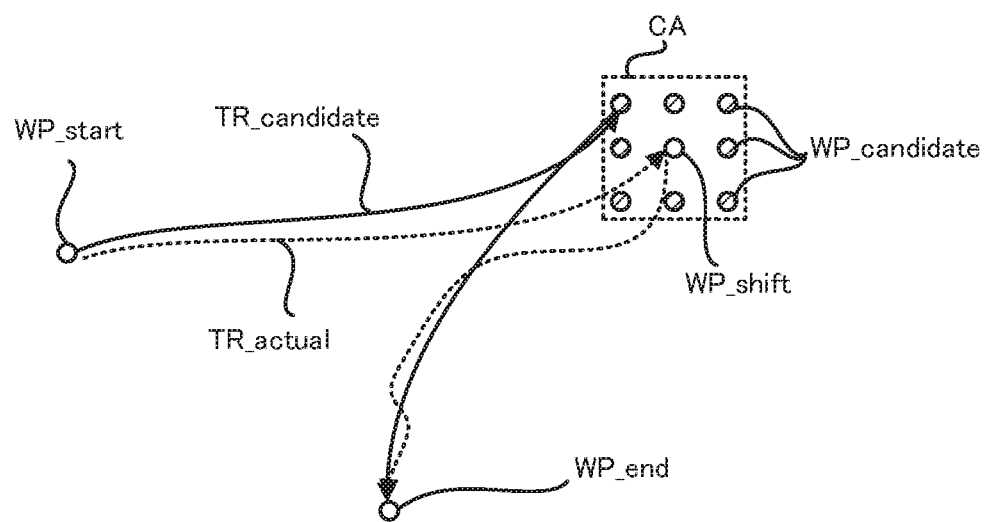
FIG. 9 is a planar view that illustrates a plurality of candidate waypoints.

On the other hand, as a result of the determination at the step S21, if it is determined that the driver requests the execution of the parking assist process (the step S21: Yes), the information reading part 1321 reads (in other words, gets, receives or obtains) the WP information stored by the WP storing part 1312 (a step S22). Especially, the information reading part 1321 reads the WP information that includes the complete waypoint WP_end that is same as or near to the position of the parking space SP in which the vehicle 1 should be parked by this time parking assist operation Then, the route generating part 1322 sets, on the basis of the shift change waypoint WP_shift included in the WP information read at the step S22, a transit waypoint WP_transit through which the vehicle 1 traveling by the parking assist process passes (a step S23). Specifically, as illustrated in FIG. 9, the route generating part 1322 sets a plurality of candidate waypoints WP_candidate each of which is a candidate of the transit waypoint WP_transit in a predetermined area CA. The predetermined area CA is an area including the shift change waypoint WP_shift included in the WP information read at the step S22. In this case, the route generating part 1322 may set the plurality of candidate waypoints WP_candidate that are arranged evenly in the predetermined area CA. Alternatively, the route generating part 1322 may set the plurality of candidate waypoints WP_candidate that are located or arranged in local or random area(s) in the predetermined area CA that allows the below described target route TR_target to be appropriate (for example, that allows a below described evaluation score SC2 to be relatively small). The route generating part 1322 selects, as the transit waypoint WP_transit, one of the plurality of candidate waypoints WP_candidate.

In order to select one of the plurality of candidate waypoints WP_candidate as the transit waypoint WP_transit, the route generating part 1322 calculates the evaluation score SC2 of each of a plurality of traveling routes TR_candidate. Each of the plurality of traveling routes TR_candidate is a traveling route that reaches the complete waypoint WP_end included in the WP information read at the step S22 from the current position of the vehicle 1 or the start waypoint WP_start included in the WP information read at the step S22 via respective one of the plurality of candidate waypoints WP_candidate. The evaluation score SC2 is a quantitative index value that represents an optimum degree (in other word, a degree of a goodness or an appropriateness) of the traveling route TR_candidate. As described later, the route generating part 1322 generates, as the target route TR_target, a traveling route that reaches the complete waypoint WP_end from the current position of the vehicle 1 or the start waypoint WP_start via the transit waypoint WP_transit. Therefore, the traveling route TR_candidate corresponds to a candidate of the target route TR_target.

The evaluation score SC2 is different from the above described evaluation score SC1 in that the evaluation score SC2 is the index value that represents the optimum degree of the traveling route TR_candidate and the evaluation score SC1 is the index value that represents the optimum degree of the traveling route TR_actual. Another feature of the evaluation score SC2 is same as another feature of the evaluation score SC1. Namely, the above described description relating to the evaluation score SC1 is used as the description relating to the evaluation score SC2, if the term "traveling route TR_actual" is replaced by the term "traveling route TR_candidate". Therefore, the evaluation score SC2 is an index value that is determined on the basis of at least a distance between the vehicle 1 traveling along the traveling route TR_candidate and the obstacle O that exists around the traveling route TR_candidate. Moreover, the route generating part 1322 repeats a process of setting the target point P on the traveling route TR_candidate (a process corresponding to the process at the step S161 in FIG. 3), a process of calculating the distance D between the obstacle O and each of the plurality of specific portions E of the vehicle 1 locating at the target point P (a process corresponding to the process at the step S162 in FIG. 3), a process of calculating a basic score SC2$b$ for each specific portion E on the basis of the distance D (a process corresponding to the process at the step S163 in FIG. 3), a process of setting the plurality of weighting coefficients w on the basis of the traveling condition of the vehicle 1 at the target point P (a process corresponding to the process at the step S164 in FIG. 3) and a process of calculating a weighted score SC2$w$ ($=\Sigma(SC2b \times w)$) at the target point P (a process corresponding to the process at the step S165 in FIG. 3) while changing the target point P (a process corresponding to the process at the step S166 in FIG. 3). Then, the route generating part 1322 calculates the evaluation score SC2 by executing a process of calculating the evaluation score SC2 ($=\Sigma(SC2w)$) by adding the calculated weighted scores SC2$w$ (a process corresponding to the process at the step S167 in FIG. 3).

Allowing one weighting coefficient w to be larger than another weighting coefficient w in the parking assist process is equivalent to determining that the traveling route TR_candidate that prioritizes avoiding the interference between the obstacle O and one specific portion E corresponding to one weighting coefficient w is more appropriate the traveling route TR_candidate that prioritizes avoiding the interference between the obstacle O and another specific portion E corresponding to another weighting coefficient w. The reason is already described in the description about the learning process. Thus, allowing one weighting coefficient w to be larger than another weighting coefficient w is equivalent to selecting the transit waypoint WP_transit (namely, generating the target route TR_target) so that avoiding the interference between the obstacle O and one specific portion E is prioritized over avoiding the interference between the obstacle O and another specific portion E. Namely, allowing one weighting coefficient w to be larger than another weighting coefficient w is equivalent to selecting the transit waypoint WP_transit (namely, generating the target route TR_target) so that increasing the distance between the obstacle O and one specific portion E is prioritized over increasing the distance between the obstacle O and another specific portion E.

Then, the route generating part 1322 selects, as the transit waypoint WP_transit, one candidate waypoint WP_candidate corresponding to one traveling route TR_candidate having the smallest evaluation score SC2 from the plurality of candidate waypoints WP_candidate. Namely, the route generating part 1322 sets the transit waypoint WP_transit so that the evaluation score SC2 of the target route TR_target that reaches the complete waypoint WP_end from the start waypoint WP_start or the current position of the vehicle 1 via the transit waypoint WP_transit is minimized. In other words, the route generating part 1322 sets the transit waypoint WP_transit so that the traveling route TR_candidate having the smallest evaluation score SC2 is set to the target route TR_target.

Then, the route generating part 1322 generates, as the target route TR_target along which the vehicle 1 should travel, a traveling route that reaches the complete waypoint WP_end included in the WP information read at the step S22 via the transit waypoint WP_transit set at the step S23 (a step S24). In this case, if the vehicle 1 is at or near the start waypoint WP_start at a timing when it is determined that the driver requests the execution of the parking assist process, the route generating part 1322 generates, as the target route TR_target, a traveling route that reaches the complete waypoint WP_end from the start waypoint WP_start included in the WP information read at the step S22 via the transit waypoint WP_transit. On the other hand, if the vehicle 1 is not near the start waypoint WP_start (for example, the vehicle 1 is away from the start waypoint WP_start by a predetermined distance or more) at the timing when it is determined that the driver requests the execution of the parking assist process, the route generating part 1322 generates, as the target route TR_target, a traveling route that reaches the complete waypoint WP_end from the current position of the vehicle 1 via the transit waypoint WP_transit. Note that the existing method of generating the traveling route along which the vehicle 1 travels via a specified position may be used and thus the detailed description of the method of generating the traveling route will be omitted for the purpose of simple description.

Then, the vehicle controlling part 1323 makes the vehicle 1 automatically travel along the target route TR_target generated at the step S24 by controlling at least one of a power source (for example, an engine) of the vehicle 1, a brake apparatus of the vehicle 1, a steering apparatus of the vehicle 1 and a gear mechanism (in other words, transmission mechanism) of the vehicle 1 (a step S25). Namely, the vehicle controlling part 1323 makes the vehicle 1 travel automatically so that the vehicle 1 reaches the complete waypoint WP_end from the start waypoint WP_start or the current position of the vehicle 1 via the transit waypoint WP_transit. As a result, the vehicle 1 is automatically parked in the parking space SP without requiring the user's operation of an acceleration pedal, a brake pedal, a steering wheel and a shift lever (in other words, a selector).

(3) Technical Effect

As described above, in the present embodiment, the learning unit 131 uses the evaluation score SC1 based on the distance D between the obstacle O and each of the plurality of specific portions E of the vehicle 1 in order to determine which WP information is stored by the WP storing part 1312 (namely, in order to determine which WP information is used to generate the traveling route TR_target). Moreover, the learning unit 131 uses the plurality of weighting coefficients w corresponding to the plurality of specific portions E that are set on the basis of the traveling condition of the vehicle 1 when the learning unit 131 calculates the evaluation score SC1. In addition, the parking assist unit 132 also uses the evaluation score SC2 based on the distance D between the obstacle O and each of the plurality of specific portions E of the vehicle 1 in order to generate the target route TR_target. Moreover, the parking assist unit 132 uses the plurality of weighting coefficients w corresponding to the plurality of specific portions E that are set on the basis of the traveling condition of the vehicle 1 when the parking assist unit 132 calculates the evaluation score SC2. Thus, the present embodiment achieves a technical effect that the parking assist unit 132 is capable of generating the target route TR_target so as to avoid (in other words, prevent) the interference between the vehicle 1 and the obstacle O more appropriately, compared to a comparison example in which the target route TR_target is generated without sectioning the vehicle 1 into the plurality of specific portions E and without considering the traveling condition of the vehicle 1. Next, this technical effect will be described for each pattern of the traveling condition of the vehicle 1.

Figure 10:
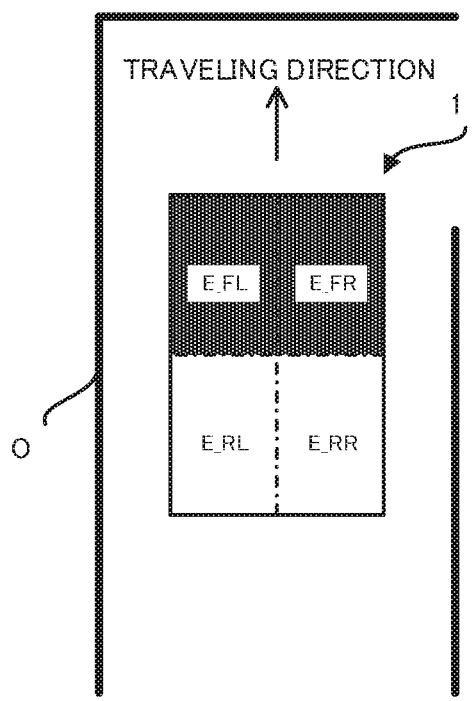
FIG. 10 is a planar view that illustrates a positional relationship between the obstacle and the vehicle that travels frontward (especially, straightforwardly).

Firstly, FIG. 10 is a planer view that illustrates a positional relationship between the obstacle O and the vehicle 1 that travels frontward (especially, straightforwardly). Since the vehicle 1 travels frontward, the possibility that the left front edge portion E_FL interferes with the obstacle O_FL and the possibility that the right front edge portion E_FR interferes with the obstacle O_FR are higher than the possibility that the left rear edge portion E_RL interferes with the obstacle O_RL and the possibility that the right rear edge portion E_RR interferes with the obstacle O_RR. According to the present embodiment, the weighting coefficients w_FL and w_FR are larger than the weighting coefficients w_RL and w_RR in this case (see the step S1642 in FIG. 7). Thus, the learning process learns the WP information corresponding to the traveling route TR_actual that prioritizes avoiding the interference between the left front edge portion E_FL and the obstacle O_FL and the interference between the right front edge portion E_FR and the obstacle O_FR over avoiding the interference between the left rear edge portion E_RL and the obstacle O_RL and the interference between the right rear edge portion E_RR and the obstacle O_RR. Namely, the learning process learns the WP information corresponding to the traveling route TR_actual that prioritizes avoiding the interference between the obstacle O and the specific portion E having a relatively high possibility of interfering with the obstacle O. Furthermore, the parking assist process generates the target route TR_target on the basis of the WP information learned like this so that avoiding the interference between the left front edge portion E_FL and the obstacle O_FL and the interference between the right front edge portion E_FR and the obstacle O_FR is prioritized over avoiding the interference between the left rear edge portion E_RL and the obstacle O_RL and the interference between the right rear edge portion E_RR and the obstacle O_RR. Namely, the parking assist process generates the target route TR_target so as to prioritize avoiding the interference between the obstacle O and the specific portion E having a relatively high possibility of interfering with the obstacle O. Thus, it is possible to generate the target route TR_target that is capable of appropriately (in other words, preferentially, same applies to the following description) avoiding the interference between the obstacle O and the specific portion E having a relatively high possibility of interfering with the obstacle O due to the traveling condition of the vehicle 1 that travels frontward (especially, straightforwardly).

Figure 11:
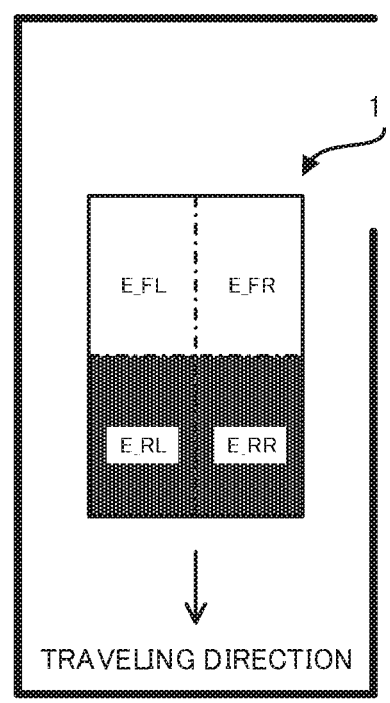
FIG. 11 is a planar view that illustrates a positional relationship between the obstacle and the vehicle that travels backward (especially, straightforwardly).

Next, FIG. 11 is a planer view that illustrates a positional relationship between the obstacle O and the vehicle 1 that travels backward (especially, straightforwardly). Since the vehicle 1 travels backward, the possibility that the left rear edge portion E_RL interferes with the obstacle O_RL and the possibility that the right rear edge portion E_RR interferes with the obstacle O_RR are higher than the possibility that the left front edge portion E_FL interferes with the obstacle O_FL and the possibility that the right front edge portion E_FR interferes with the obstacle O_FR. According to the present embodiment, the weighting coefficients w_RL and w_RR are larger than the weighting coefficients w_FL and w_FR in this case (see the step S1646 in FIG. 7). Thus, it is possible to generate the target route TR_target that is capable of appropriately avoiding the interference between the obstacle O and the specific portion E having a relatively high possibility of interfering with the obstacle O due to the traveling condition of the vehicle 1 that travels backward (especially, straightforwardly), for the same reason as the case where the vehicle 1 travels frontward, even when the vehicle 1 travels backward.

Figure 12:
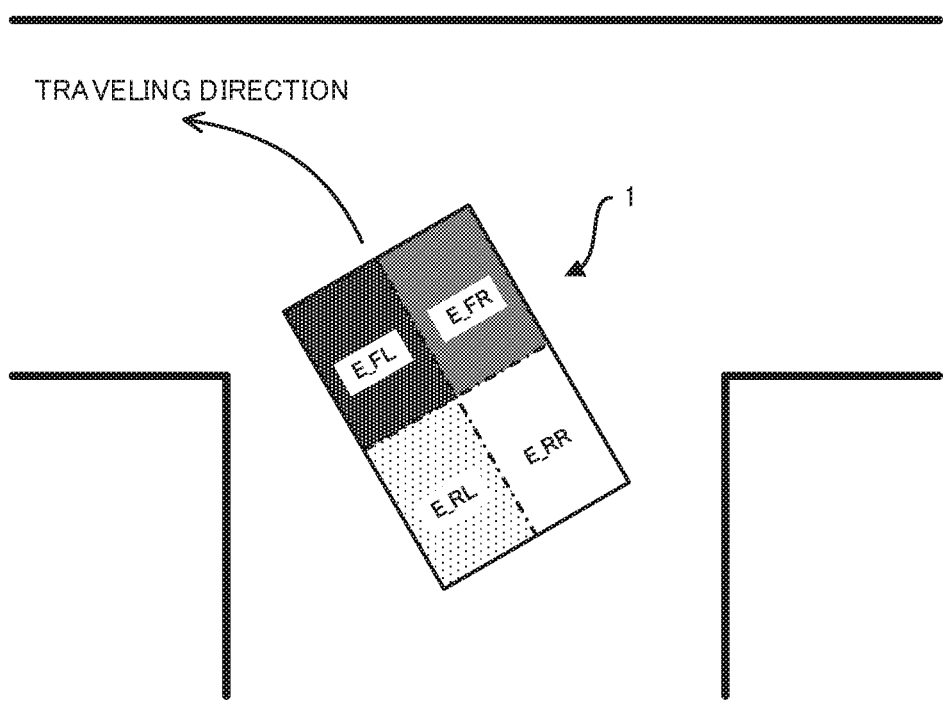
FIG. 12 is a planar view that illustrates a positional relationship between the obstacle and the vehicle that travels frontward while turning in a counterclockwise direction.

Next, FIG. 12 is a planer view that illustrates a positional relationship between the obstacle O and the vehicle 1 that travels frontward while turning in the counterclockwise direction. As described above, since the vehicle 1 travels frontward, the possibility that the left front edge portion E_FL interferes with the obstacle O_FL and the possibility that the right front edge portion E_FR interferes with the obstacle O_FR are higher than the possibility that the left rear edge portion E_RL interferes with the obstacle O_RL and the possibility that the right rear edge portion E_RR interferes with the obstacle O_RR. Moreover, since the vehicle 1 turns in the counterclockwise direction, the left front edge portion E_FL is nearer to a center of the turn than the right front edge portion E_FR and the right front edge portion E_FR is farther from the center of the turn than the left front edge portion E_FL (namely, the left front edge portion E_FL is at an inner side of the turn and the right front edge portion E_FR is at an outer side of the turn). Thus, the possibility that the left front edge portion E_FL interferes with the obstacle O_FL is higher than the possibility that the right front edge portion E_FR interferes with the obstacle O_FR. Moreover, since the vehicle 1 travels frontward while turning in the counterclockwise direction, the possibility that the left rear edge portion E_RL that is at the inner side interferes with the obstacle O_RL is higher than the possibility that the right rear edge portion E_RR that is at the outer side interferes with the obstacle O_RR due to a difference between inner wheels (in other words, an inner wheel difference or a turning radius difference). Namely, when the vehicle 1 travels frontward while turning in the counterclockwise direction, the possibility that the right rear edge portion E_RR interferes with the obstacle O_RR, the possibility that the left rear edge portion E_RL interferes with the obstacle O_RL, the possibility that the right front edge portion E_FR interferes with the obstacle O_FR and the possibility that the left front edge portion E_FL interferes with the obstacle O_FL becomes higher in this order. Note that FIG. 12 (moreover, same applies to the above described FIG. 10 to FIG. 11 and FIG. 13 to FIG. 15) illustrates the specific portions E so that the specific portion E is illustrated by using a darker color as the possibility that this specific portion E interferes with the obstacle O becomes higher. According to the present embodiment, the weighting coefficients w_RR, the weighting coefficient w_RL, the weighting coefficients w_FR and the weighting coefficient w_FL becomes larger in this case (see the step S1643 in FIG. 7). Thus, it is possible to generate the target route TR_target that is capable of appropriately avoiding the interference between the obstacle O and the specific portion E having a relatively high possibility of interfering with the obstacle O due to the traveling condition of the vehicle 1 that travels frontward while turning in the counterclockwise direction, for the same reason as the case where the vehicle 1 travels frontward, even when the vehicle 1 travels frontward while turning in the counterclockwise direction.

Figure 13:
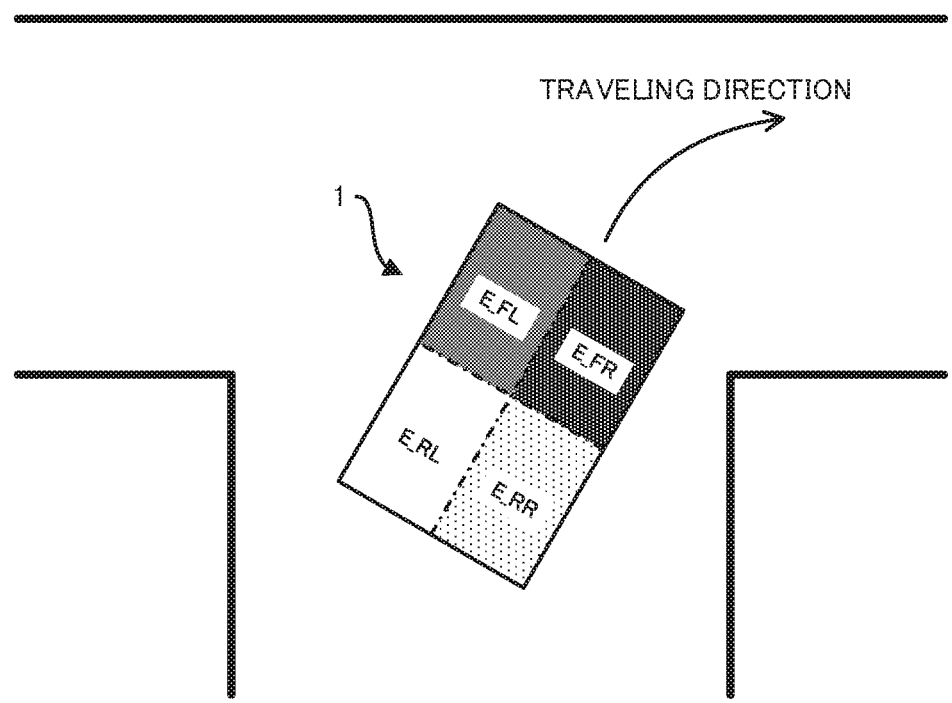
FIG. 13 is a planar view that illustrates a positional relationship between the obstacle and the vehicle that travels frontward while turning in a clockwise direction.

Next, FIG. 13 is a planer view that illustrates a positional relationship between the obstacle O and the vehicle 1 that travels frontward while turning in the clockwise direction. This case is different from the above described case where the vehicle 1 travels frontward while turning in the counterclockwise direction in that the possibility that the right front edge portion E_FR that is at the inner side interferes with the obstacle O_FR is higher than the possibility that the left front edge portion E_FL that is at the outer side interferes with the obstacle O_FL and the possibility that the right rear edge portion E_RR that is at the inner side interferes with the obstacle O_RR is higher than the possibility that the left rear edge portion E_RL that is at the outer side interferes with the obstacle O_RL due to the difference between the inner wheels. Namely, when the vehicle 1 travels frontward while turning in the clockwise direction, the possibility that the left rear edge portion E_RL interferes with the obstacle O_RL, the possibility that the right rear edge portion E_RR interferes with the obstacle O_RR, the possibility that the left front edge portion E_FL interferes with the obstacle O_FL and the possibility that the right front edge portion E_FR interferes with the obstacle O_FR becomes higher in this order. According to the present embodiment, the weighting coefficients w_RL, the weighting coefficient w_RR, the weighting coefficients w_FL and the weighting coefficient w_FR becomes larger in this case (see the step S1644 in FIG. 7). Thus, it is possible to generate the target route TR_target that is capable of appropriately avoiding the interference between the obstacle O and the specific portion E having a relatively high possibility of interfering with the obstacle O due to the traveling condition of the vehicle 1 that travels frontward while turning in the clockwise direction, for the same reason as the case where the vehicle 1 travels frontward, even when the vehicle 1 travels frontward while turning in the clockwise direction.

Figure 14:
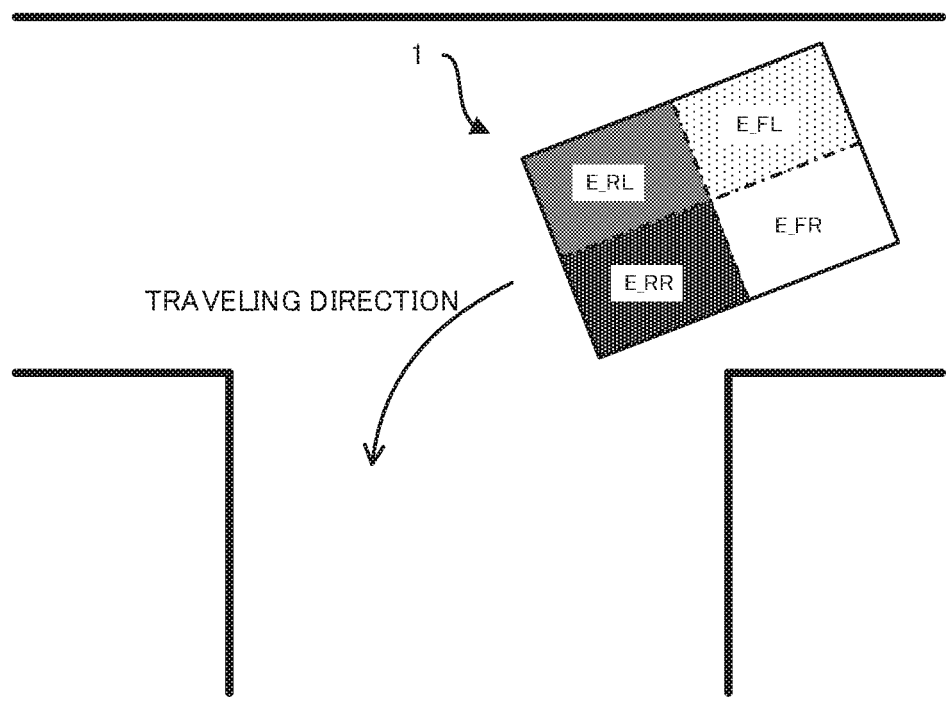
FIG. 14 is a planar view that illustrates a positional relationship between the obstacle and the vehicle that travels backward while turning in a counterclockwise direction.

Next, FIG. 14 is a planer view that illustrates a positional relationship between the obstacle O and the vehicle 1 that travels backward while turning in the counterclockwise direction. As described above, since the vehicle 1 travels backward, the possibility that the left rear edge portion E_RL interferes with the obstacle O_RL and the possibility that the right rear edge portion E_RR interferes with the obstacle O_RR are higher than the possibility that the left front edge portion E_FL interferes with the obstacle O_FL and the possibility that the right front edge portion E_FR interferes with the obstacle O_FR. Moreover, since the vehicle 1 turns in the counterclockwise direction, the possibility that the right rear edge portion E_RR that is at the inner side interferes with the obstacle O_RR is higher than the possibility that the left rear edge portion E_RL that is at the outer side interferes with the obstacle O_RL. Moreover, since the vehicle 1 travels backward while turning in the counterclockwise direction, the possibility that the left front edge portion E_FL that is at the outer side interferes with the obstacle O_FL is higher than the possibility that the right front edge portion E_FR that is at the inner side interferes with the obstacle O_FR due to a difference between outer wheels (in other words, an outer wheel difference or a turning radius difference). Namely, when the vehicle 1 travels backward while turning in the counterclockwise direction, the possibility that the right front edge portion E_FR interferes with the obstacle O_FR, the possibility that the left front edge portion E_FL interferes with the obstacle O_FL, the possibility that the left rear edge portion E_RL interferes with the obstacle O_RL and the possibility that the right rear edge portion E_RR interferes with the obstacle O_RR becomes higher in this order. According to the present embodiment, the weighting coefficients w_FR, the weighting coefficient w_FL, the weighting coefficients w_RL and the weighting coefficient w_RR becomes larger in this case (see the step S1648 in FIG. 7). Thus, it is possible to generate the target route TR_target that is capable of appropriately avoiding the interference between the obstacle O and the specific portion E having a relatively high possibility of interfering with the obstacle O due to the traveling condition of the vehicle 1 that travels backward while turning in the counterclockwise direction, for the same reason as the case where the vehicle 1 travels frontward, even when the vehicle 1 travels backward while turning in the counterclockwise direction.

Figure 15:
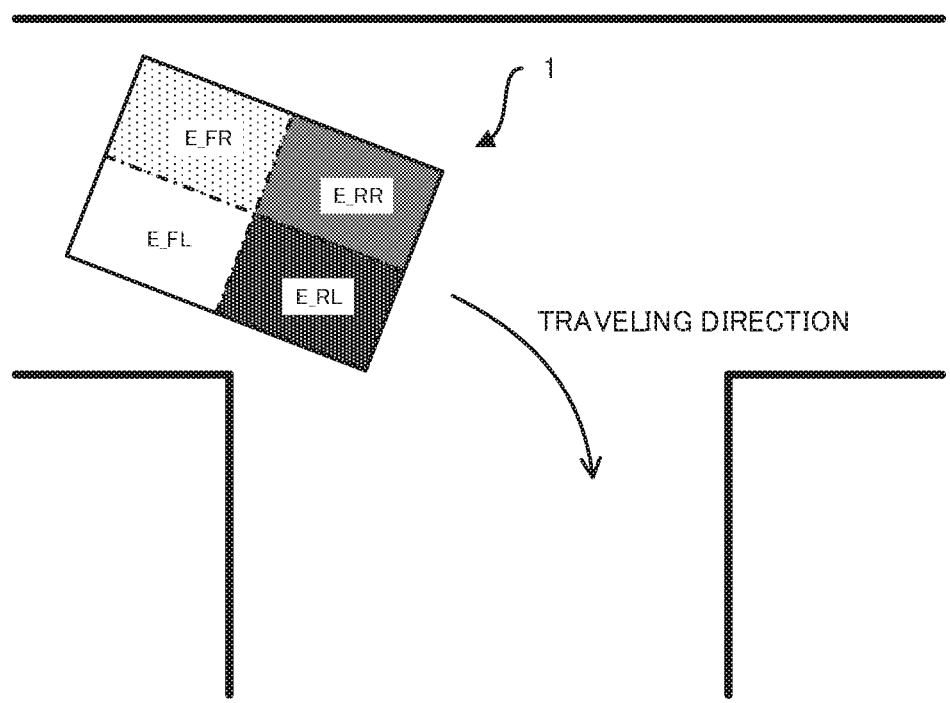
FIG. 15 is a planar view that illustrates a positional relationship between the obstacle and the vehicle that travels backward while turning in a clockwise direction.

Next, FIG. 15 is a planer view that illustrates a positional relationship between the obstacle O and the vehicle 1 that travels backward while turning in the clockwise direction. This case is different from the above described case where the vehicle 1 travels backward while turning in the counterclockwise direction in that the possibility that the left rear edge portion E_RL that is at the inner side interferes with the obstacle O_RL is higher than the possibility that the right rear edge portion E_RR that is at the outer side interferes with the obstacle O_RR and the possibility that the right front edge portion E_FR that is at the outer side interferes with the obstacle O_FR is higher than the possibility that the left front edge portion E_FL that is at the inner side interferes with the obstacle O_FL due to the difference between the outer wheels. Namely, when the vehicle 1 travels backward while turning in the clockwise direction, the possibility that the left front edge portion E_FL interferes with the obstacle O_FL, the possibility that the right front edge portion E_FR interferes with the obstacle O_FR, the possibility that the right rear edge portion E_RR interferes with the obstacle O_RR and the possibility that the left rear edge portion E_RL interferes with the obstacle O_RL becomes higher in this order. According to the present embodiment, the weighting coefficients w_FL, the weighting coefficient w_FR, the weighting coefficients w_RR and the weighting coefficient w_RL becomes larger in this case (see the step S1647 in FIG. 7). Thus, it is possible to generate the target route TR_target that is capable of appropriately avoiding the interference between the obstacle O and the specific portion E having a relatively high possibility of interfering with the obstacle O due to the traveling condition of the vehicle 1 that travels backward while turning in the clockwise direction, for the same reason as the case where the vehicle 1 travels frontward, even when the vehicle 1 travels backward while turning in the clockwise direction.

Consequently, according to the present embodiment, the weighting coefficient w that corresponds to the specific portion E having a relatively high possibility of interfering with the obstacle O is larger than the weighting coefficient w that corresponds to the specific portion E having a relatively small possibility of interfering with the obstacle O, when the specific portion E having a relatively high possibility of interfering with the obstacle O changes due to the traveling condition of the vehicle 1. Thus, it is possible to generate the target route TR_target that is capable of appropriately avoiding the interference between the obstacle O and the specific portion E having a relatively high possibility of interfering with the obstacle O, when the specific portion E having a relatively high possibility of interfering with the obstacle O changes due to the traveling condition of the vehicle 1.

(4) Modified Example

In the above described description, the route generating part 1322 generates the target route TR_target so that the evaluation score SC2 is minimized. However, when the evaluation score SC2 is small to some extent, there is a possibility that the target route TR_target corresponding to that evaluation score SC2 is appropriate to some extent (namely, the unnecessary traveling is reduced if the vehicle 1 is parked in the parking space SP in accordance with the target route TR_target). Thus, the route generating part 1322 may generate the target route TR_target so that the evaluation score SC2 is equal to or smaller than a predetermined first threshold value that allows the route generating part 1322 to distinguish a situation where the target route TR_target is appropriate from a situation where the target route TR_target is not appropriate on the basis of the evaluation score SC2.

In the above described description, the WP learning part 1311 makes the WP storing part 1312 store one WP information having the smaller evaluation score SC1 (namely, the smallest evaluation score SC1) at the step S18 in FIG. 2. However, the WP learning part 1311 may make the WP storing part 1312 store a plurality of WP information. For example, when the evaluation score SC1 is small to some extent, there is a possibility that the traveling route TR_actual corresponding to that evaluation score SC1 is appropriate to some extent (namely, the traveling route TR_actual is allowed to be used to generate the target route TR_target in the parking assist process). Thus, the WP learning part 1311 may make the WP storing part 1312 store a plurality of WP information each of which has the evaluation score SC1 that is equal to or smaller than a predetermined second threshold value that allows the WP learning part 1311 to distinguish a situation where the traveling route TR_actual is appropriate from a situation where the traveling route TR_actual is not appropriate on the basis of the evaluation score SC1.

In the above described description, the evaluation score SC2 is defined so that the evaluation score SC2 becomes smaller as the traveling route TR_candidate becomes more appropriate. However, the evaluation score SC2 may be defined so that the evaluation score SC2 becomes larger as the traveling route TR_candidate becomes more appropriate. In this case, the route generating part 1322 may set the transit waypoint WP_transit so that the evaluation score SC2 becomes larger at the step S23 in FIG. 8. For example, the route generating part 1322 may set the transit waypoint WP_transit so that the evaluation score SC2 becomes the largest. Alternatively, the route generating part 1322 may set the transit waypoint WP_transit so that the evaluation score SC2 is equal to or larger than a predetermined third threshold value that allows the route generating part 1322 to distinguish the situation where the target route TR_target is appropriate from the situation where the target route TR_target is not appropriate on the basis of the evaluation score SC2. Namely, the route generating part 1322 may generate the target route TR_target having the evaluation score SC2 becomes the largest or equal to or larger than the third threshold value.

Similarly, in the above described description, the evaluation score SC1 is defined so that the evaluation score SC1 becomes smaller as the traveling route TR_actual becomes more appropriate. However, the evaluation score SC1 may be defined so that the evaluation score SC1 becomes larger as the traveling route TR_actual becomes more appropriate. In this case, the WP learning part 1311 may make the WP storing part 1312 store the WP information having the larger evaluation score SC1 (namely, the largest evaluation score SC1) at the step S18 in FIG. 2. Alternatively, the WP learning part 1311 may make the WP storing part 1312 store at least one WP information which has the evaluation score SC1 that is equal to or larger than a predetermined fourth threshold value that allows the WP learning part 1311 to distinguish the situation where the traveling route TR_actual is appropriate from the situation where the traveling route TR_actual is not appropriate on the basis of the evaluation score SC1.

In the above described description, the route generating part 1322 uses the evaluation score SC2 in generating the target route TR_target by using the waypoint WP. However, the route generating part 1322 may use the evaluation score SC2 in generating the target route TR_target by using any route generation method. Namely, the route generating part 1322 may generate the target route TR_target corresponding to the smallest evaluation score SC2 by using any route generation method. At least one of a RRT (Rapidly exploring Random Tree) method and a potential method disclosed in the above described Patent Literature 1 is one example of any route generation method.

In the above described description, the route generating part 1322 uses the evaluation score SC2 in generating the target route TR_target along which the vehicle 1 should travel when the vehicle 1 is automatically parked in the desired parking space SP. However, the route generating part 1322 may use the evaluation score SC2 not only in the case where the vehicle 1 is automatically parked in the parking space SP but also in the case where any moving route (namely, the traveling route) is generate along which the vehicle 1 should travel. Namely, the route generation part 1322 may generate any moving route corresponding to the smallest evaluation score SC2.

(5) Additional Statement

Relating to the above described embodiment, following additional statements will be disclosed.

(5-1) Additional Statement 1

A route generation apparatus according to the additional statement 1 is provided with: a generating device that is configured to generate, on the basis of an evaluation score, a moving route of a movable object that reaches a second position from a first position so as to avoid an interference between the movable object and at least one obstacle that is likely to interfere with each of a plurality of specific portions of the movable object during a period when the movable objects moves from the first position to the second position, the evaluation score being obtained by executing a weighting process on a distance between the obstacle and each of the plurality of specific portions on the basis of a plurality of weighting coefficients that correspond to the plurality of specific portions, respectively; and a setting device that is configured to set at least one of the plurality of weighting coefficients on the basis of a moving condition of the movable object during a period when the movable objects moves on the moving route.

Alternatively, a route generation apparatus according to the additional statement 1 may be provided with a controller, the controller is programmed to: generate, on the basis of an evaluation score, a moving route of a movable object that reaches a second position from a first position so as to avoid an interference between the movable object and at least one obstacle that is likely to interfere with each of a plurality of specific portions of the movable object during a period when the movable objects moves from the first position to the second position, the evaluation score being obtained by executing a weighting process on a distance between the obstacle and each of the plurality of specific portions on the basis of a plurality of weighting coefficients that correspond to the plurality of specific portions, respectively; and set at least one of the plurality of weighting coefficients on the basis of a moving condition of the movable object during a period when the movable objects moves on the moving route.

The route generation apparatus according to the additional statement 1 consider the evaluation score based on the distance between each of the plurality of specific portions and the obstacle the is likely to interfere with each specific portion (specifically, the obstacle that is closest to each specific portion), when the route generation apparatus generates the moving route so as to avoid the interference between the movable object and the obstacle. Moreover, at least one of the plurality of weighting coefficients that corresponds to the plurality of specific portions, respectively, is set on the basis of the moving condition of the movable object, when the evaluation score is obtained. Therefore, the route generation apparatus according to the additional statement 1 is capable of generating the moving route so as to avoid the interference between the movable object and the obstacle more appropriately, compared to a route generation apparatus in a comparison example that is configured to generate the moving route without sectioning the movable object into the plurality of specific portions and without considering the moving condition.

(5-2) Additional Statement 2

A route generation apparatus according to the additional statement 2 is the route generation apparatus according to the additional statement 1, wherein the setting device is configured to (alternatively, the controller is programmed to) set at least one of the plurality of weighting coefficients so as to prioritize avoiding an interference between the obstacle and a second specific portion of the plurality of specific portions over avoiding an interference between the obstacle and a first specific portion of the plurality of specific portions, the possibility that the obstacle interferes with the second specific portion being higher than the possibility that the obstacle interferes with the first specific portion due to the moving condition.

The route generation apparatus according to the additional statement 2 is capable of generating the moving route that is capable of avoiding the interference between the obstacle and the specific portion having a relatively high possibility of interfering with the obstacle (5-3) Additional Statement 3

A route generation apparatus according to the additional statement 3 is the route generation apparatus according to the additional statement 1 or 2, wherein the plurality of specific portions include at least a front edge portion including a front edge part of the movable object and a rear edge portion including a rear edge part of the movable object, the setting device is configured to (alternatively, the controller is programmed to) set at least one of a first weighting coefficient corresponding to the front edge portion of the plurality of weighting coefficients and a second weighting coefficient corresponding to the rear edge portion of the plurality of weighting coefficients so as to prioritize avoiding an interference between the obstacle and the front edge portion over avoiding an interference between the obstacle and the rear edge portion, when the movable object is in a moving condition in which the movable object moves frontward, the setting device is configured to (alternatively, the controller is programmed to) set at least one of the first weighting coefficient and the second weighting coefficient so as to prioritize avoiding the interference between the obstacle and the rear edge portion over avoiding the interference between the obstacle and the front edge portion, when the movable object is in a moving condition in which the movable object moves backward.

The route generation apparatus according to the additional statement 3 is capable of generating the moving route that is capable of avoiding the interference between the obstacle and the specific portion having the relatively high possibility of interfering with the obstacle, in a situation where the specific portion having the relatively high possibility of interfering with the obstacle changes depending on the moving condition of the movable object.

(5-4) Additional Statement 4

A route generation apparatus according to the additional statement 4 is the route generation apparatus according to any one of the additional statements 1 to 3, wherein the plurality of specific portions include at least a right rear edge portion including a right rear edge part of the movable object and a left rear edge portion including a left rear edge part of the movable object, the setting device is configured to (alternatively, the controller is programmed to) set at least one of a third weighting coefficient corresponding to the right rear edge portion of the plurality of weighting coefficients and a fourth weighting coefficient corresponding to the left rear edge portion of the plurality of weighting coefficients so as to prioritize avoiding an interference between the obstacle and the right rear edge portion over avoiding an interference between the obstacle and the left rear edge portion, when the movable object is in a moving condition in which the movable object moves frontward while turning in a clockwise direction, the setting device is configured to (alternatively, the controller is programmed to) set at least one of the third weighting coefficient and the fourth weighting coefficient so as to prioritize avoiding the interference between the obstacle and the left rear edge portion over avoiding the interference between the obstacle and the right rear edge portion, when the movable object is in a moving condition in which the movable object moves frontward while turning in a counterclockwise direction.

The route generation apparatus according to the additional statement 4 is capable of generating the moving route that is capable of avoiding the interference between the obstacle and the specific portion having the relatively high possibility of interfering with the obstacle, in the situation where the specific portion having the relatively high possibility of interfering with the obstacle changes depending on the moving condition of the movable object.

(5-5) Additional Statement 5

A route generation apparatus according to the additional statement 5 is the route generation apparatus according to any one of the additional statements 1 to 4, wherein the plurality of specific portions include at least a right front edge portion including a right front edge part of the movable object and a left front edge portion including a left front edge part of the movable object, the setting device is configured to (alternatively, the controller is programmed to) set at least one of a fifth weighting coefficient corresponding to the right front edge portion of the plurality of weighting coefficients and a sixth weighting coefficient corresponding to the left front edge portion of the plurality of weighting coefficients so as to prioritize avoiding an interference between the obstacle and the right front edge portion over avoiding an interference between the obstacle and the left front edge portion, when the movable object is in a moving condition in which the movable object moves backward while turning in a clockwise direction, the setting device is configured to (alternatively, the controller is programmed to) set at least one of the fifth weighting coefficient and the sixth weighting coefficient so as to prioritize avoiding the interference between the obstacle and the left front edge portion over avoiding the interference between the obstacle and the right front edge portion, when the movable object is in a moving condition in which the movable object moves backward while turning in a counterclockwise direction.

The route generation apparatus according to the additional statement 5 is capable of generating the moving route that is capable of avoiding the interference between the obstacle and the specific portion having the relatively high possibility of interfering with the obstacle, in the situation where the specific portion having the relatively high possibility of interfering with the obstacle changes depending on the moving condition of the movable object.

(5-6) Additional Statement 6

A route generation apparatus according to the additional statement 4 is the route generation apparatus according to any one of the additional statements 1 to 5, wherein the evaluation score is a score based on a parameter that is obtained by multiplying a distance between the obstacle and each of the plurality of specific portions with respective one of the plurality of weighting coefficients and then adding the multiplied distances.

The route generation apparatus according to the additional statement 6 is capable of generating the moving route based on the evaluation score.

(5-7) Additional Statement 7

A route generation apparatus according to the additional statement 7 is the route generation apparatus according to the additional statement 6, wherein the plurality of specific portions include at least a front edge portion including a front edge part of the movable object and a rear edge portion including a rear edge part of the movable object, the setting device is configured to (alternatively, the controller is programmed to) set at least one of a first weighting coefficient corresponding to the front edge portion of the plurality of weighting coefficients and a second weighting coefficient corresponding to the rear edge portion of the plurality of weighting coefficients so that the first weighting coefficient is larger than the second weighting coefficient, when the movable object is in a moving condition in which the movable object moves frontward, the setting device is configured to (alternatively, the controller is programmed to) set at least one of the first weighting coefficient and the second weighting coefficient so that the first weighting coefficient is smaller than the second weighting coefficient, when the movable object is in a moving condition in which the movable object moves backward.

The route generation apparatus according to the additional statement 7 is capable of generating the moving route that is capable of avoiding the interference between the obstacle and the specific portion having the relatively high possibility of interfering with the obstacle, in the situation where the specific portion having the relatively high possibility of interfering with the obstacle changes depending on the moving condition of the movable object.

(5-8) Additional Statement 8

A route generation apparatus according to the additional statement 8 is the route generation apparatus according to the additional statement 6 or 7, wherein the plurality of specific portions include at least a right rear edge portion including a right rear edge part of the movable object and a left rear edge portion including a left rear edge part of the movable object, the setting device is configured to (alternatively, the controller is programmed to) set at least one of a third weighting coefficient corresponding to the right rear edge portion of the plurality of weighting coefficients and a fourth weighting coefficient corresponding to the left rear edge portion of the plurality of weighting coefficients so that the third weighting coefficient is larger than the fourth weighting coefficient, when the movable object is in a moving condition in which the movable object moves frontward while turning in a clockwise direction, the setting device is configured to (alternatively, the controller is programmed to) set at least one of the third weighting coefficient and the fourth weighting coefficient so that the third weighting coefficient is smaller than the fourth weighting coefficient, when the movable object is in a moving condition in which the movable object moves frontward while turning in a counterclockwise direction.

The route generation apparatus according to the additional statement 8 is capable of generating the moving route that is capable of avoiding the interference between the obstacle and the specific portion having the relatively high possibility of interfering with the obstacle, in the situation where the specific portion having the relatively high possibility of interfering with the obstacle changes depending on the moving condition of the movable object.

(5-9) Additional Statement 9

A route generation apparatus according to the additional statement 9 is the route generation apparatus according to any one of the additional statements 6 to 8, wherein the plurality of specific portions include at least a right front edge portion including a right front edge part of the movable object and a left front edge portion including a left front edge part of the movable object, the setting device is configured to (alternatively, the controller is programmed to) set at least one of a fifth weighting coefficient corresponding to the right front edge portion of the plurality of weighting coefficients and a sixth weighting coefficient corresponding to the left front edge portion of the plurality of weighting coefficients so that the fifth weighting coefficient is larger than the sixth weighting coefficient, when the movable object is in a moving condition in which the movable object moves backward while turning in a clockwise direction, the setting device is configured to (alternatively, the controller is programmed to) set at least one of the fifth weighting coefficient and the sixth weighting coefficient so that the fifth weighting coefficient is smaller than the sixth weighting coefficient, when the movable object is in a moving condition in which the movable object moves backward while turning in a counterclockwise direction.

The route generation apparatus according to the additional statement 9 is capable of generating the moving route that is capable of avoiding the interference between the obstacle and the specific portion having the relatively high possibility of interfering with the obstacle, in the situation where the specific portion having the relatively high possibility of interfering with the obstacle changes depending on the moving condition of the movable object.

At least one portion of the feature in the above described embodiment may be eliminated or modified accordingly. At least one portion of the feature in the above described embodiments may be combined with another one of the above described embodiments.

This application is based upon and claims the benefit of priority of the prior Japanese Patent Application No. 2018-038708, filed on Mar. 5, 2018, the entire contents of which are incorporated herein by reference. In addition, the entire contents of the above described Patent Literatures 1 to 2 are incorporated herein by reference.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention. A route generation apparatus, which involve such changes, are also intended to be within the technical scope of the present invention.

REFERENCE SIGNS LIST 1 vehicle
11 external surrounding detect apparatus
12 internal condition detect apparatus
13 ECU
131 learning unit
1311 WP learning part
1312 WP storing part
132 parking assist unit
1321 information reading part
1322 route generating part
1323 vehicle controlling part
TR_actual, TR_candidate traveling route
TR_target target route
WP waypoint
WP_start start waypoint
WP_shift shift change waypoint
WP_end complete waypoint
WP_transit transit waypoint
WP_candidate candidate waypoint
SP parking space
CA predetermined area
SC1, SC2 evaluation score
SC1$b$, SC1$b$_FL, SC1$b$_FR, SC1$b$_RL, SC1$b$_RR basic score
E, E_FL, E_FR, E_RL, E_RR specific portion
w, w_FL, w_FR, w_RL, w_RR weighting coefficient
D, D_FL, D_FR, D_RL, D_RR distance
O, O_FL, O_FR, O_RL, O_RR obstacle

The invention claimed is:

1. A movable object control apparatus comprising a controller,
the controller being programmed to:
generate, on the basis of an evaluation score, a moving route of a movable object that reaches a second position from a first position so as to avoid an interference between the movable object and at least one obstacle that is likely to interfere with each of a plurality of portions of the movable object during a period when the movable object moves from the first position to the second position, the evaluation score being obtained by executing a weighting process on a distance between the obstacle and each of the plurality of portions on the basis of a plurality of weighting coefficients that correspond to the plurality of portions, respectively;
set at least one of the plurality of weighting coefficients on the basis of a moving condition of the movable object during a period when the movable object moves on the moving route; and
control the movable object so that the movable object travels along the generated moving route,
wherein the plurality of portions are a plurality of edge portions of the movable object.

2. The movable object control apparatus according to claim 1, wherein
the controller is programmed to set at least one of the plurality of weighting coefficients so as to prioritize avoiding an interference between the obstacle and a second portion of the plurality of portions over avoiding an interference between the obstacle and a first portion of the plurality of portions, the possibility that the obstacle interferes with the second portion being higher than the possibility that the obstacle interferes with the first portion due to the moving condition.

3. The movable object control apparatus according to claim 1, wherein
the plurality of edge portions include at least a front edge portion including a front edge part of the movable object and a rear edge portion including a rear edge part of the movable object,
the controller is programmed to set at least one of a first weighting coefficient corresponding to the front edge portion of the plurality of weighting coefficients and a second weighting coefficient corresponding to the rear edge portion of the plurality of weighting coefficients so as to prioritize avoiding an interference between the obstacle and the front edge portion over avoiding an interference between the obstacle and the rear edge portion, when the movable object is in a moving condition in which the movable object moves frontward,
the controller is programmed to set at least one of the first weighting coefficient and the second weighting coefficient so as to prioritize avoiding the interference between the obstacle and the rear edge portion over avoiding the interference between the obstacle and the front edge portion, when the movable object is in a moving condition in which the movable object moves backward.

4. The movable object control apparatus according to claim 1, wherein
the plurality of edge portions include at least a right rear edge portion including a right rear edge part of the movable object and a left rear edge portion including a left rear edge part of the movable object,
the controller is programmed to set at least one of a third weighting coefficient corresponding to the right rear edge portion of the plurality of weighting coefficients and a fourth weighting coefficient corresponding to the left rear edge portion of the plurality of weighting coefficients so as to prioritize avoiding an interference between the obstacle and the right rear edge portion over avoiding an interference between the obstacle and the left rear edge portion, when the movable object is in a moving condition in which the movable object moves frontward while turning in a clockwise direction,
the controller is programmed to set at least one of the third weighting coefficient and the fourth weighting coefficient so as to prioritize avoiding the interference between the obstacle and the left rear edge portion over avoiding the interference between the obstacle and the right rear edge portion, when the movable object is in a moving condition in which the movable object moves frontward while turning in a counterclockwise direction.

5. The movable object control apparatus according to claim 1, wherein
the plurality of edge portions include at least a right front edge portion including a right front edge part of the movable object and a left front edge portion including a left front edge part of the movable object,
the controller is programmed to set at least one of a fifth weighting coefficient corresponding to the right front edge portion of the plurality of weighting coefficients and a sixth weighting coefficient corresponding to the left front edge portion of the plurality of weighting coefficients so as to prioritize avoiding an interference between the obstacle and the right front edge portion over avoiding an interference between the obstacle and the left front edge portion, when the movable object is in a moving condition in which the movable object moves backward while turning in a clockwise direction,
the controller is programmed to set at least one of the fifth weighting coefficient and the sixth weighting coefficient so as to prioritize avoiding the interference between the obstacle and the left front edge portion over avoiding the interference between the obstacle and the right front edge portion, when the movable object is in a moving condition in which the movable object moves backward while turning in a counterclockwise direction.

6. The movable object control apparatus according to claim 1, wherein
the evaluation score is a score based on a parameter that is obtained by multiplying a distance between the obstacle and each of the plurality of portions with respective one of the plurality of weighting coefficients and then adding the multiplied distances.

7. The movable object control apparatus according to claim 6, wherein
the plurality of edge portions include at least a front edge portion including a front edge part of the movable object and a rear edge portion including a rear edge part of the movable object,
the controller is programmed to set at least one of a first weighting coefficient corresponding to the front edge portion of the plurality of weighting coefficients and a second weighting coefficient corresponding to the rear edge portion of the plurality of weighting coefficients so that the first weighting coefficient is larger than the second weighting coefficient, when the movable object is in a moving condition in which the movable object moves frontward,
the controller is programmed to set at least one of the first weighting coefficient and the second weighting coefficient so that the first weighting coefficient is smaller than the second weighting coefficient, when the movable object is in a moving condition in which the movable object moves backward.

8. The movable object control apparatus according to claim 6, wherein
the plurality of edge portions include at least a right rear edge portion including a right rear edge part of the movable object and a left rear edge portion including a left rear edge part of the movable object,
the controller is programmed to set at least one of a third weighting coefficient corresponding to the right rear edge portion of the plurality of weighting coefficients and a fourth weighting coefficient corresponding to the left rear edge portion of the plurality of weighting coefficients so that the third weighting coefficient is larger than the fourth weighting coefficient, when the movable object is in a moving condition in which the movable object moves frontward while turning in a clockwise direction,
the controller is programmed to set at least one of the third weighting coefficient and the fourth weighting coefficient so that the third weighting coefficient is smaller than the fourth weighting coefficient, when the movable object is in a moving condition in which the movable object moves frontward while turning in a counterclockwise direction.

9. The movable object control apparatus according to claim 6, wherein
the plurality of edge portions include at least a right front edge portion including a right front edge part of the movable object and a left front edge portion including a left front edge part of the movable object, the controller is programmed to set at least one of a fifth weighting coefficient corresponding to the right front edge portion of the plurality of weighting coefficients and a sixth weighting coefficient corresponding to the left front edge portion of the plurality of weighting coefficients so that the fifth weighting coefficient is larger than the sixth weighting coefficient, when the movable object is in a moving condition in which the movable object moves backward while turning in a clockwise direction, the controller is programmed to set at least one of the fifth weighting coefficient and the sixth weighting coefficient so that the fifth weighting coefficient is smaller than the sixth weighting coefficient, when the movable object is in a moving condition in which the movable object moves backward while turning in a counterclockwise direction.

* * * * *